(12) United States Patent
Hoyle

(10) Patent No.: US 7,058,948 B2
(45) Date of Patent: Jun. 6, 2006

(54) SYNCHRONIZATION OBJECTS FOR MULTI-COMPUTER SYSTEMS

(75) Inventor: Stephen L. Hoyle, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 850 days.

(21) Appl. No.: 09/928,115

(22) Filed: Aug. 10, 2001

(65) Prior Publication Data

US 2003/0041173 A1    Feb. 27, 2003

(51) Int. Cl.
*G06F 9/00*    (2006.01)

(52) U.S. Cl. .......................................... 718/104; 707/8

(58) Field of Classification Search ........ 718/100–108; 711/147–152, 100–173; 709/201–250; 710/200; 719/312; 707/1–10, 201, 205
See application file for complete search history.

(56) References Cited

U.S. PATENT DOCUMENTS

| | | | | |
|---|---|---|---|---|
| 6,047,316 A | * | 4/2000 | Barton et al. ............... | 709/216 |
| 6,353,869 B1 | * | 3/2002 | Ofer et al. ................... | 710/200 |
| 6,748,593 B1 | * | 6/2004 | Brenner et al. ............. | 718/105 |
| 6,823,511 B1 | * | 11/2004 | McKenney et al. ......... | 718/102 |
| 2001/0014905 A1 | * | 8/2001 | Onodera ...................... | 709/102 |

* cited by examiner

*Primary Examiner*—William Thomson
*Assistant Examiner*—Charles Anya
(74) *Attorney, Agent, or Firm*—Richard P. Lange

(57) ABSTRACT

Several multiprocessor computer systems, each having its own copy of an operating system, are interconnected to form a multi-computer system having global memory accessible by any processor on any node and including provision for spinlock access control. In this environment, a global mutex, and other like synchronization objects, are realized that can control the coordination of multiple threads running on multiple processors and on multiple nodes or platforms. Each global mutex is supported by a local operating system shadow mutex on each node or platform where threads have opened access to the global mutex. Global mutex functionality is thus achieved that reflects and utilizes the local operating system's mutex system.

6 Claims, 14 Drawing Sheets

SYNCHRONIZATION OBJECTS FOR MULTI-COMPUTER SYSTEMS

BACKGROUND OF THE INVENTION

The present invention relates generally to the sharing of resources by multitasking computer systems, and more particularly to arrangements for controlling access to computing resources that should only be used by one task at a time in a multi-computer environment.

When computers first came into existence, they were operated using single instructions that were executed one instruction at a time. As computers became more powerful, they grew more efficient and eventually were able to do many things at once. Today's computers have the ability to perform multitasking. Multitasking is the ability to execute more than one task at the same time. A "process" is a program that is being executed plus the bookkeeping information that is used by the operating system to control that process. A "task" is also a process, but a "task" may be several processes. Whenever a program is executed, the operating system creates a new task or process for the program. The task or process is analogous to an envelope for the program. It identifies the program with a task or process number, and it attaches other bookkeeping information to the program.

Originally, and for a number of years, every computer contained only one processor or CPU, and there was only one way to deliver a set of different tasks to the processor of the computer—one task at a time. First task 1 is processed, then task 2 is processed, and so on. Work on task 2 can begin before task 1 is completed, but only by stopping the work on task 1 whenever work on task 2 is being done, and vice versa.

Now computers have become more sophisticated, and multiple processors are taking the place of single processors. On such a multiple processor computer, called a "multiprocessor system" (or just "multiprocessor"), any task can be assigned to any one of the processors, and work can now actually be done simultaneously upon multiple tasks. Since more tasks can be completed in less time this way, a multiprocessor system delivers better performance than does a computer having only one processor.

A task or an individual computer program can sometimes be viewed as a collection of "subtasks." If these subtasks can be organized so that a multiprocessor system can execute some of them at the same time without changing the results computed by the task or program, then the overall task or program can be completed in less time, even though the time required to complete each subtask may not have changed. Thus, multiprocessor systems enable some individual computer tasks and programs to run faster. Constructing a task or program as a collection of subtasks that can be processed simultaneously is called "parallel programming." Running a task or program as separate subtasks that are actually processed simultaneously is called "parallel processing."

Originally, parallel programming and parallel processing required that the subtasks of a program or task actually be tasks that can run as entirely separate, independent processes. More recently, computer technology has been developed that allows tasks, processes, or programs to be divided into distinct subtasks or subprocesses or subprograms, processing units that may be called "threads." Each "thread" is a subtask or subprocess that can be delivered independently to a different processor. Computer programs organized as multiple threads are called "multithreaded programs." Although there is a significant technical difference between tasks or processes on the one hand and threads on the other, the difference is not an important one in the context of the invention described below. No formal distinction will be made between a task or process on the one hand and a subtask or thread on the other hand. All such entities will be referred to as "threads" in the discussion which follows.

"Multi-computer systems" provide an extension beyond multiprocessor systems as to how multiple processors can be organized for use by multi-threaded tasks. A "multi-computer system" (or just multi-computer) is a group of computers, each running its own copy of the operating system, that work together to achieve a particular goal. That goal is to present their collective computing resources, so that they appear to belong as much as possible to a single operating system running on a single computer, both to programs that use the computer's resources, and also to human beings that make use of the multi-computer system in some way. Typically, there are also hardware resources (memory, for example), which are shared and are directly accessible by all the computers in the multi-computer system. Just as multiprocessor systems can deliver better performance than single processor systems, multi-computer systems can often deliver better performance than multiprocessor systems. However, constructing programs that run well on a multi-computer system can be especially difficult unless the multi-computer system itself does a very good job of presenting itself to programs as if it were a single computer. Most of the time, this means the multi-computer system must hide the fact that there are actually multiple operating systems running on the separate computers which make up the multi-computer system.

A multi-threaded task operates in a way similar to the way in which a small company operates. As an example, consider a small company with three departments: manufacturing, sales, and accounting. For the company to run efficiently, the tasks of each department need to be performed concurrently. Typically, manufacturing operations are not shut down until the items in a previously manufactured batch have all been sold. Thus, manufacturing and sales proceed at the same time. Although invoices cannot be prepared for items not yet sold, they can and should be prepared and processed for previously sold items even while new sales are being negotiated and while a new batch of items is being manufactured. Although the three tasks have interdependencies requiring them to coordinate their activities, none can be shut down completely while one of the other tasks is executed from beginning to end.

Many software tasks operate under the same conditions as this company example. They have multiple tasks or subtasks that can be executed at the same time as separate threads or sets of threads. However, these tasks or subtasks also have interdependencies that require coordination: portions of one task that cannot proceed until portions of one or more other tasks have been completed. Programming a set of such tasks so their work can be properly coordinated while they all run simultaneously is called "synchronization." Specific programming constructs are used to implement synchronization. These are called "synchronization objects."

A very simple case requiring coordination occurs when several tasks need to share a single resource, but the resource is such that it can only be used by one task at a time. A very small business, for example, may have only a single phone line that needs to be used for different purposes at different times by the two or three people who run the business.

Likewise, in multithreaded computer programs, multiple threads frequently need to share computing resources such as data, files, communication channels, etc. that can only be used by one thread at a time. To control this resource sharing, "synchronization objects" are required that allow each thread to take a turn accessing a given resource and to prevent other threads from accessing the resource while one thread takes its turn.

Mechanisms that satisfy this property in some manner are called "locks." A particular type of lock often used is called a "mutex", which is a nickname for the words "mutual exclusion." Typically, an operating system, working in conjunction with certain hardware features of a processor, provides mutex functions that allow threads to acquire, release, and wait for mutexes. Once a thread has acquired a mutex, other threads cannot acquire the same mutex until the first thread releases it. A given mutex is normally associated with a particular computing resource, perhaps a specific record in a data file. By programming convention, no thread is allowed to access the given specific record unless it has first "acquired" the associated mutex. In this manner, multiple threads can access the given specific record, and each thread excludes the other threads from access while it takes its turn.

The present invention is directed towards achieving a mutex that is operative in a multi-computer environment where each separate computer has its own separate copy of the operating system.

One way in which one might create synchronization objects for multi-computer systems and cause these synchronization objects to have essentially the same functionality and the same programming interfaces as do synchronization objects within a multiprocessing environment (which employs only a single copy of an operating system) would be to rewrite completely the operating system code that manages thread synchronization. New code would be added to the operating system that determines when a mutex function is called and whether each call refers to a local mutex (accessible only by threads running on a single local computer) or to a global mutex (accessible by threads running on any computer within a multi-computer system). New code would also be inserted into the operating system to support function calls that refer to the global mutex. In addition, the different running copies of the operating system would need to be modified so that they communicate with and know about each other and to make sure that threads from all the computers receive a chance to acquire a global mutex, while also enforcing the required mutex rules of sharing for all threads on all platforms.

This approach has several disadvantages. First, this approach does not leverage the value of the existing operating system code for thread synchronization. Secondly, this approach requires access to, and the legal right to modify, the operating system source code. Thirdly, because the base operating system's code would have to be modified, the new replacement code would have to be thoroughly tested in all of the numerous environments that utilize the operating system, including multi-and single-processor system environments that gain no benefit from this new code. Changes implemented solely to support multi-computer systems thus must be tested extensively in non-multi-computer environments. Typically, for modern operating systems, this testing effort creates a very substantial amount of work that is difficult to cost justify.

BRIEF SUMMARY OF THE INVENTION

The present invention provides an effective method for extending operating system mutex functionality across multiple copies of an operating system where each computer is running a separate copy of the operating system but all are working together as a multi-computer system. Mutexes supported by the present invention are thus usable by any thread running on any computer within the multi-computer system, but the mutexes present themselves through programming interfaces to the threads just as though each mutex was supported only by a single instance of the operating system running on a single computer.

Briefly summarized, the present invention is a multi-computer system having provision for global synchronization objects which comprises a plurality of multi-processor nodes each having provision for local memory, threads, and an operating system having the ability to manage local synchronization objects, global memory accessible to the processors on all the nodes and having at least one spinlock; a data structure in memory accessible by all the processors wherein one or more records for global synchronization objects may be established, said data structure including provision for recording in a queue the identity of nodes having threads awaiting access to the synchronization object; and a synchronization software system of programs established in all the nodes which, at the request of a thread running on a node, can create, open, request, release, and close a global synchronization object, using the above spinlock and data structure and queue of node identities to resolve requests for the synchronization object as between threads residing on different nodes, and using local synchronization objects created by the local operating systems on nodes having threads awaiting access to resolve requests for the synchronization object between threads residing on the same node.

The queue in which is recorded the identity of the nodes having threads awaiting access to the global synchronization object may be organized as a FIFO arrangement of the node identifiers ordered in the same order in which requests for the global synchronization object are received from the threads. And the node identifiers may be moved from the front to the back of the queue each time the threads on the correspondingly identified node are given an opportunity to gain ownership of the local and global synchronization objects. Additionally, counts may be maintained for each node of the number of threads awaiting a synchronization object, and those counts may be decremented when a thread on the corresponding node is granted the synchronization object, and the reference to the name of the corresponding node in the data structure may be removed when the count reaches zero. The global synchronization objects may be semaphores or mutexes.

The present invention may also be found in a method for granting threads running on various multi-processor nodes within a multi-computer system ownership of a global synchronization object comprising the steps of maintaining a record of the state of the global synchronization object as free, owned, or in transition; when a thread seeks ownership of the global synchronization object, granting the thread, through a spinlock mechanism, access to the status of the global synchronization object, and granting the thread ownership if the object is free; but if the object is not free (owned or in transition), adding the thread's node to a queue of nodes having threads awaiting ownership of the global synchronization object and permitting the thread to seek ownership of a local synchronization object established on the thread's node by a local operating system, but temporarily blocking threads on the thread's node from seeking ownership of the local synchronization object and forcing them into suspension; and when the global synchronization object ownership is released by a thread, placing the global synchronization object into its transition state, and then arranging for each node in the queue, in turn, to stop blocking threads on its node from seeking ownership of the local synchronization object, and permitting any thread that then gains ownership of its local synchronization object to resume execution and to gain ownership of the global synchronization object if the object is not owned (free or in transition), this process continuing until the global synchronization object is owned or until no more threads seek its ownership, at which point the global synchronization object enters its free state. Again, the synchronization objects may be semaphores or mutexes.

And finally, the invention may be found in a set of synchronization software computer programs designed for use in conjunction with a multi-computer system where individual nodes have their own copies of an operating system with local node synchronization software included in the operating system, the synchronization software computer programs being capable of carrying out the steps listed above.

DETAILED DESCRIPTION OF THE PREFERRED EMBODIMENTS

A. Introduction

Figure 1:
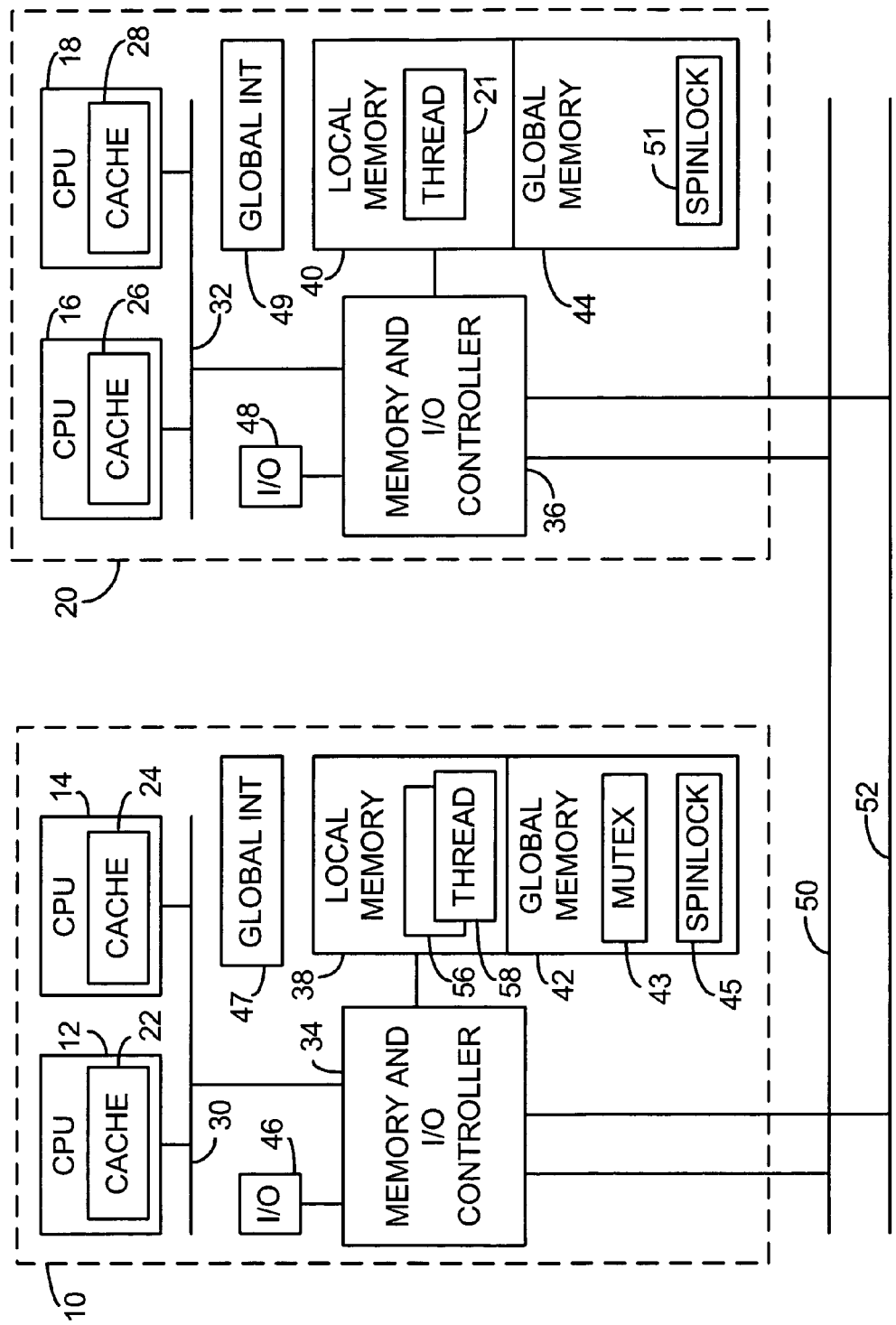
FIG. 1 is a logical diagram of two or more multi-processor computer systems or "nodes" connected in parallel to form a multi-computer system, with each node having both local and global memory, the multi-computer having at least one global mutex.

Before describing the invention, a brief explanation of the way in which mutexes work on multi-processors will be helpful to provide a reference context for the description which follows.

Suppose three threads have requested ownership of a given mutex that is already owned by some other thread, and suppose each thread is willing to stop processing further instructions until it acquires the mutex. Suppose, in addition, that the threads request ownership of the mutex in the following chronological order.

Thread A1.
Thread B1.
Thread A2.

Normally, A1 would be expected to gain ownership of the mutex when the current owner releases it. Later, B1 would be expected to gain ownership when A1 releases the mutex, and then A2 when B1 releases it. This behavior would be the result of a First-In-First-Out or FIFO policy on the part of the operating system for managing the outstanding thread acquisition requests for a given mutex. An appropriate experiment with a given operating system would typically demonstrate this behavior, but with exceptions under certain circumstances. For example, if B1 or A2 were running with a higher scheduling "priority" than A1, then the operating system would normally give ownership of the mutex to one of them rather than to A1 when the current owner releases the mutex. On the other hand, the operating system might not do this if A1 has been waiting in the queue for a very long time. Otherwise, it would be possible that A1 might never acquire ownership of the mutex, regardless of how long it waits in the queue. Thus, operating systems are usually designed to give priority to some threads but to insure that every thread is eventually given ownership of the mutex.

Although any given operating system will probably have a precise deterministic set of rules defining how it departs from a pure FIFO policy for managing mutex wait queues, the details of such rules normally will not be exposed and will not be guaranteed to remain unchanged from one version of the operating system to the next. Without access to the source code of the operating system, it would be extremely difficult to know these rules precisely, and even more difficult to duplicate their effect in new code. Accordingly, applications cannot be programmed to depend heavily upon the precise workings of any given set of rules. Applications can only expect the following: Mutex acquisition requests will mostly be granted using FIFO queue ordering, with occasional variations to account for different thread scheduling priorities; but any thread willing to wait for a long time will eventually be guaranteed ownership of a mutex. The invention described in this disclosure supports this behavior for multi-computer extensions of the mutexes provided by a given operating system. It also provides an architecture that captures the variations in mutex behavior which are provided by different operating systems or by different versions of the same operating system, and it replicates such behavior as accurately as is feasible and logical with respect to global mutexes in a multi-computer environment.

In the discussion which follows, each of the computers forming part of a multi-computer system will be referred to as a "node."

The following assumptions (set forth in the next three paragraphs) are made regarding synchronization objects (mutexes, semaphores, etc.) provided by the operating system running upon each node of the multi-computer system:

"Mutex objects" are supported, and they include "wait for acquisition" functionality. This means the following behavior can be specified to the operating system when a call is made by a thread to acquire a mutex: If the mutex is already owned, the calling thread is placed in a wait queue, and it is blocked from executing any further instructions until the mutex is available and can be given to the thread as requested.

"Event objects" for signaling to threads are also supported. An "event" has one of two possible states: signaled or non-signaled. Functions are provided to switch between the two states. A "wait for an event" function for an event is also provided with the following property: When the function is called referring to a given event, if the event is in the "non-signaled state," the operating system will block the calling thread from executing any further instructions until a call is made (by some other thread) that switches the event to the "signaled state."

The operating system provides a function that combines the "wait" functionality of both events and mutexes. When this function is called, the operating system blocks the calling thread from executing any further instructions until both the event has been signaled and the mutex can be given to the thread as requested. (The combination of functionality set forth in this and the preceding two paragraphs are not requirements of the invention. They simplify the following description, and they were available on the operating system where the prototype version of this invention was originally implemented.)

Now, with reference to FIG. 1, a multi-computer system 1 is shown that includes two or more nodes 10 and 20. Each node is a multiprocessor that contains two or more processors or CPUs 12, 14, 16, and 18. Each node also has a memory and I/O controller 34 and 36, local memory 38 and 40 accessible by a node's CPUs only, and some provision for input and output or I/O 46 and 48 that provides access to hard disk drives (not shown), to internets and intranets (not shown), to printers (not shown), and to other external devices, computers, and locations. One or more data and command busses 50 and 52 interconnect the memory and I/O controllers 34 and 36 such that all the nodes 10 and 20 may access the same shared global memory segments 42 and 44.

The following assumptions are made regarding the resources that are shared by the nodes 10 and 20 of the multi-computer system 1 shown in FIG. 1:

There is at least some global memory or its equivalent, such as at least one of the global memory segments 42 and 44, that is accessible from any node 10 or 20 in the multi-computer system 1;

There is at least one primitive global lock such as the global spinlocks 45 and 51 or their equivalent that are usable from any node 10 or 20 in the multi-computer system 1 to lock the global memory segment 42 or 44 during, for example, the "read-modify-write" or "read, test, and modify if necessary" CPU hardware memory access commands that are used to implement a mutex, a semaphore, or some other synchronization object;

There is a global interrupt mechanism or its equivalent, such as a task scheduler. From any node in the multi-computer system 1, a processor interrupt or its equivalent can be generated and supplied to at least one processor on any other node or in the same node. For example, the nodes 10 and 20 are shown having the global interrupts 47 and 49; and The global resources described in the above assumptions are supported by hardware in some manner that is relatively independent of any particular operating system. In the absence of such hardware support, each of these resources can be emulated purely by software, generally speaking, but with less efficiency in performance.

The above assumptions are not a typical for a multi-computer system, as defined in this disclosure, and these assumptions are true concerning the Data General Model multi-computer system upon which the invention was implemented and tested as a prototype. The operating system installed upon each node was Microsoft Windows NT, version 4.0.

Typical examples of multi-computer system architectures are illustrated in U.S. Pat. No. 6,047,316 (Apr. 4, 2000) and U.S. Pat. No. 5,887,146 (Mar. 23, 1999). The '316 patent discusses problems relating to spinlock implementation. The '146 patent illustrates a hardware configuration similar to that illustrated in FIG. 1.

The global lock referred to in these assumptions will be the global spinlock 45 in the remainder of this description. It is analogous to the spinlock normally provided on single multi-processor computers. Although it provides globally, over an array of several computers, a form of mutual exclusion functionality, it is primitive in that it normally does not provide any form of "wait for acquisition" functionality, as described earlier. That kind of functionality cannot even be described without referring to objects (such as mutexes) and to operations that are normally provided by an operating system (threads and thread scheduling, for example). A multi-computer system having a spinlock is thus analogous to a single multiprocessor computer system having two or more CPUs where spinlocks are used by the operating system as the basis for building many different kinds of synchronization constructs, including mutexes.

In this discussion, the terms "local mutex", "shadow mutex", and "shadow local mutex" refer to a mutex fully managed by the unmodified operating system running on a particular node of a multi-computer system. The term "global mutex" refers to a multi-computer system managed scheduling and resource sharing object having the properties of a mutex. Whenever the context is clear enough to avoid ambiguity, the term "mutex" may be used to refer to either a local mutex or to a global mutex.

B. Overview Description of the Invention

Figure 4:
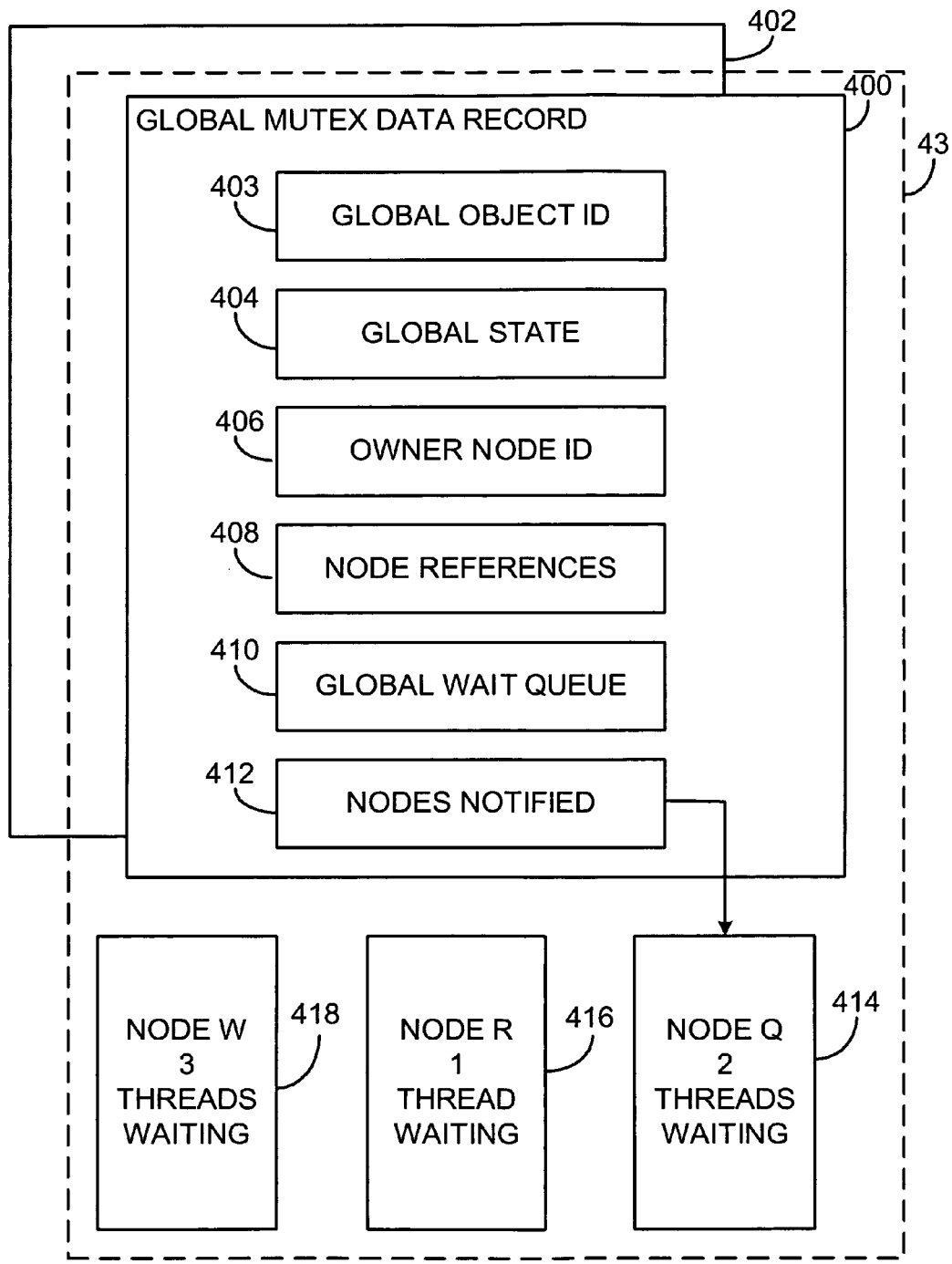
FIG. 4 illustrates the data structure of a global data record that resides within the global memory shown in FIG. 2 and that is associated with a global mutex.

The multi-computer system 1 is shown in FIG. 1 to include a global mutex 43 implemented using the global memory 42. Access to the global memory 42 is governed by a global spinlock 45. The global mutex 43 is defined, in part by a global data record 400 shown in FIGS. 2 and 4. The information within this record 400 includes a global state value 404 that indicates whether the global mutex 43 is "owned" by a node and thread, or is "available," or is in "transition". This information also includes a global wait queue 410, which is shown in FIGS. 4 and 6 including the node records 414, 416, and 418 of nodes that have threads suspended and waiting to acquire the global mutex 43.

Figure 3:
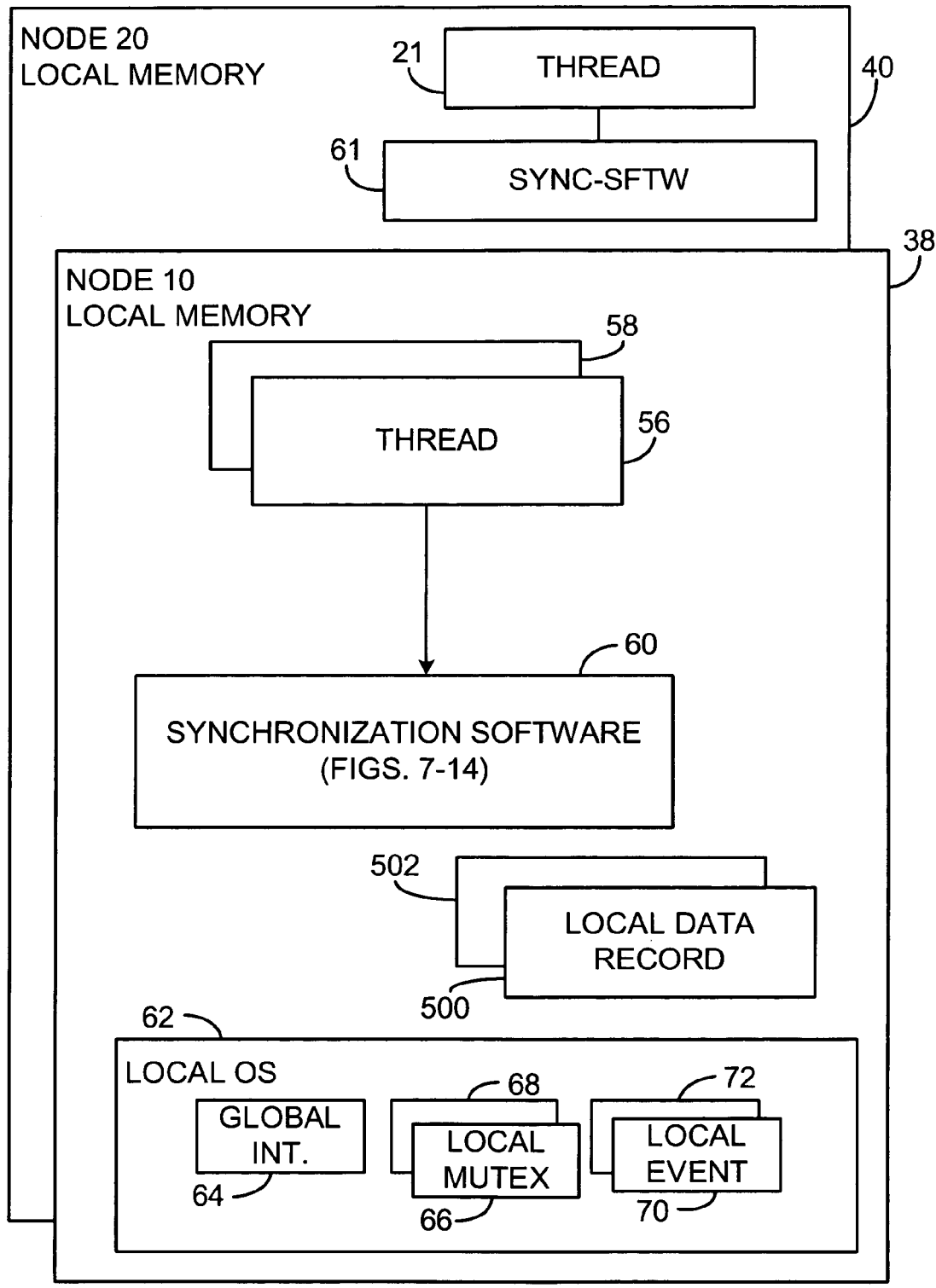
FIG. 3 illustrates in part the contents of local memory on two nodes of the multi-computer system shown in FIG. 1.

The invention provides a global mutex synchronization service that runs as a collection of software components, collectively called the global mutex synchronization software 60 (FIGS. 3, 6, and 7–14), that is running on each node 10 and 20 of the multi-computer system 1. The functions for mutex management are supported as direct calls into the components of this synchronization software 60 that are running on the same node 10 or 20 as the calling thread 56 or 58 or 21 (FIGS. 1, 3 and 6). Thus, when the global mutex 43 is available, it is possible to satisfy immediately a mutex acquisition request issued by any thread 56, 58, or 21 running on any node 10 or 20 by executing a program (within the synchronization software 60) that only uses processor resources on the node where the requesting thread resides.

This is achieved using processor resources located only at the node where the request is made in the following manner: The global mutex 43 is represented on each node, for example, the node 10, from which it will be accessed by a local mutex 66 located on the node 10. Thus, if the global mutex 43 is being used by threads running on three different nodes of a multi-computer system, there will be three different local mutexes used to support the single global mutex 43, one on each node. Each of these local mutexes will be called a "shadow mutex" for the global mutex 43. When a request is made by the thread 56 running on the node 10 (FIGS. 1 and 6) to acquire the global mutex 43 which is already owned by some other thread, such as the thread 21 running on the node 20 in FIGS. 1 and 6, the node 10 of the calling thread is inserted into the global wait queue 410 (FIG. 4) for the global mutex 43 that is maintained in the global memory 42 (unless the node 10 is already in the wait queue 410, because some other thread 58 from the node 10 is already suspended and waiting to acquire the global mutex, in which case the suspended thread count for the node 10 is incremented instead, as will be explained). A request is then made to the operating system 62 at the node 10 where the requesting thread 56 resides to acquire the associated shadow local mutex 66 for the thread 56.

Figure 6:
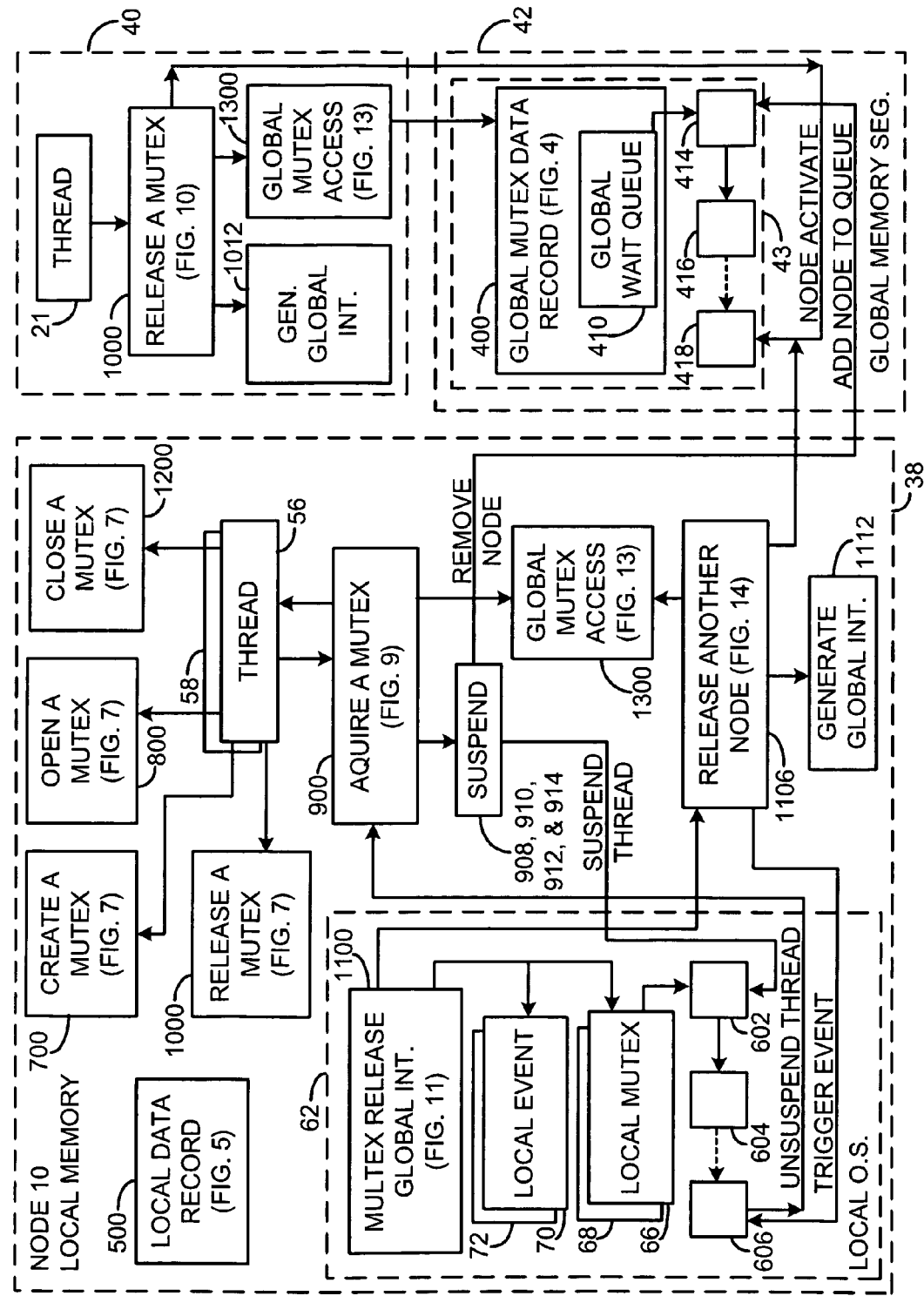
FIG. 6 is a diagram illustrating the memory contents of the local memories and of one global memory of a multi-computer system, indicating with arrows subroutine calls and data accesses, and illustrating the use of the synchronization software (shown in the following figures) to create and manage a global mutex.

In the preceding paragraph, it was tacitly assumed that the calling thread 56 is willing to join a suspended thread wait queue, such as that shown at 602, 604, and 606 in FIG. 6, which is linked to the shadow local mutex 66. Typically, the mutex functionality provided by an operating system 62 permits mutex acquisition requests specifying an immediate return, even if the local mutex 66 is not available. Requests of this type are easily supported: After checking the global memory mutex data record 400 associated with the mutex 43, the synchronization software 60 simply returns program control to the thread 56 with an indication that the global mutex 43 is already owned. For the remainder of this description, it will be assumed that all acquisition requests are those for which the calling thread 56 is willing to join a suspended thread wait queue such as that shown at 602, 604, and 606 in FIG. 6 if the global mutex 43 is not immediately available.

When the current owner of a global mutex (for example, the thread 21 on the node 20 in FIG. 6) releases it (by calling the release mutex program 1000 shown in FIG. 10), and assuming that other threads 56 are waiting to acquire it, program control is transferred to the node 10 where the first thread 56 to have requested the mutex 43 is presumed to be waiting in a suspended state. This transfer to node 10 is based on the FIFO ordering of the global wait queue 410 that is linked to the node records 414, 416, and 418 which have threads suspended and awaiting access to the global mutex 43. This transfer action will be referred to as "signaling the next FIFO node." This action is carried out using the mutex release global interrupt program 1100 shown in FIG. 11. The response to this interrupt is a call to the operating system 62 at the receiving node 10, causing it to unblock one of the threads 602, 604, or 606 waiting there for access to the associated shadow local mutex 66. Thus, this invention uses FIFO ordering in the global wait queue 410 to pass around control of the global mutex 43 among all of the nodes 10 and 20, but each operating system 42 is allowed to apply its own policy for granting ownership of local mutexes such as the shadow local mutex 66 among the threads 602, 604, and 606 that it may control. For each global mutex, this design approximates the behavior of a local mutex among the threads running on different nodes, and it provides essentially the exact behavior of a local mutex among any set of threads running on the same node.

Referring back to the example set forth above: When the current owner thread 21 releases the global mutex 43, control will be given to the node 10 (in the global wait queue 410 at position 418) where the thread 58 is suspended (in the local wait queue 602, 604, 606 of the local mutex 66 at position 606), with operating system management of the shadow local mutex 66 by the node 10 determining the observed behavior of the global mutex 43. If the thread 56 and some other thread 58 are running on the same node 10, the behavior on the node 10 as between the two local threads will be identical to what would happen if the two local threads were actually using only the local mutex 66. If a third thread (not shown) were instead running on some other node, it will not be able to acquire the mutex when the current owner releases it to the node 10. Either the thread 56 or the thread 58 will acquire the global mutex 43, and the choice between them will be identical to what would have happened if they were actually using only the local mutex 66.

When the thread 56 later releases the global mutex 43, it also releases the shadow local mutex 66 on the node 10 where it is running so that the shadow mutex 66 will be available when the synchronization software 60 needs to acquire it for another thread 58 suspended on that same node 10. The synchronization software 60 needs to be able to prevent the operating system 42 from prematurely giving the shadow local mutex 66 to some other thread 58 without first acquiring the global mutex 43 for the thread 58. After releasing the shadow local mutex 42, the synchronization software 60 signals to the next node named in record 416 in the global FIFO wait queue 410 that the global mutex 43 is now available. But while that is happening, if there is another thread 58 on the first node 10 already suspended and waiting for the shadow local mutex 66, the operating system 62 would reactivate it, granting it ownership of the local shadow mutex 66, because the local shadow mutex 66 has been released. If the next node named in record 416 is a different node, then two different threads on two different nodes could become unblocked, and each would expect to gain ownership of the global mutex 43.

Again referring back to the example at the beginning of this section, suppose A1 and A2 are running on a node A, B1 is running on a node B, and A1 acquires the global mutex when the current owner releases it. Later, when A1 releases the local shadow mutex (as part of releasing the global mutex), the situation described in the preceding paragraph would occur: node A, knowing nothing about B1, would unblock A2, and node B, knowing nothing about A2, would unblock B1.

One of the threads must be blocked, since only one of them can own the global mutex 43. Although most operating systems would probably offer several options for blocking one of the threads, the method used by this invention as described so far—waiting to acquire a shadow local mutex—appears not to be viable for this situation. The present invention in its prototype embodiment resolves this problem by using a local event 70 along with the shadow local mutex 66 to help control when the operating system 42 on the node 10 unblocks a thread 56 or 58 that is waiting for the global mutex 43. A request by any thread 56 or 58 to wait for a global mutex 43 is actually transformed into a call to the local operating system 62 to have the thread wait for both the shadow local mutex 66 and the local event 70 both of which are associated with the global mutex 43. By maintaining the local event 70 at the node 10 in the non-signaled state until the appropriate time, the synchronization software 60 can exert control over when the operating system 42 unblocks a thread 56 or 58 that is waiting for the shadow local mutex 66. Thus, when it receives an interrupt indicating that the global mutex 43 has been released, the synchronization software 60 calls upon the local operating system 42 to signal the local event 70. Immediately following that, it makes a second call to switch the local event 70 back to the non-signaled state (see step 1102 in FIG. 11).

Typically, any thread waiting on local synchronization objects can end its wait asynchronously, even though the wait conditions have not been satisfied. A timeout may have expired, or some independent action may have caused execution of the thread to be terminated. Thus, after the thread 21 releases the global mutex 43 and starts the procedure to signal the next node named in record 418 of the global FIFO wait queue 410, but before the interrupt driven synchronization software 60 (specifically, the program 1100 shown in FIG. 11) on that next node interrupts and calls upon the operating system 42 to signal the local event 70 associated with the global mutex 43, the queue of threads 602, 604, 606 waiting for the shadow local mutex 66 at that node 10 may become empty. Therefore, after causing the local event 70 to be signaled, the synchronization software 60 tests at (step 1102 in FIG. 11) whether a thread that was waiting has acquired the shadow local mutex 66. If not, and if there are more nodes in the global FIFO wait queue 410, then the next node named in record 416 of the queue 410 is signaled that the global mutex 43 has been released (routine 1106 shown in FIG. 14).

A race condition may develop from events such as those described in the preceding paragraph. This race condition is formally managed by a global state value 404 that can be set to any one of three mutually exclusive global states for every global mutex: available, owned, and in transition. The mutex 43 can be in the available state only when there are no threads and no nodes in the global wait queue 410. While in the available state, immediate ownership of the mutex 43 is given to any thread requesting it, and the mutex 43 then enters the owned state. While the mutex 43 is in the owned state, any thread requesting ownership (other than the owning thread itself) is placed into the global and local wait queues—the synchronization software 60 places the thread's node into a record of the global wait queue 410 and then calls upon the operating system 42 to block further execution of the thread requesting the mutex until the associated local event 70 is signaled. When a thread owning the mutex 43 releases it, if there are no nodes in the global wait queue 410 waiting for the mutex 43, the mutex 43 returns to the available state. Otherwise, it enters the third transition state until a new thread takes over ownership.

Upon entering the transition state, the node whose record 418 is at the head of the global FIFO wait queue 410 (for example, the node 10) is notified that it may give ownership of the mutex 43 to the highest priority of its waiting threads at the head end of the local mutex 66's FIFO wait queue at 606. Upon receiving such notification, the node 10 causes the local event 70 associated with the global mutex 43 to be signaled, and then it determines whether the associated shadow mutex 66 has been acquired by any threads at that node 10. If the shadow local mutex 66 is not acquired immediately by the actuated thread, then the second node named in record 416 in the global FIFO wait queue 410 is notified that it may give ownership of the mutex 43 to one of its waiting threads. This process may be repeated multiple times, causing multiple nodes 10, 20, etc. to be placed into a race to find a thread that is ready to take ownership of the mutex 43. But new threads seeking ownership of the mutex 43 during this race are blocked out of the competition by the fact that the mutex 43 is in its "transition" state, not its "available" state.

When the mutex 43 is in the transition state, the first thread (such as the thread 56 on node 10) to unblock and to acquire the global spinlock 45 guarding the global memory 42 and the global mutex data record 400 of the mutex 43 becomes its owner, and the mutex 43 then returns to the owned state. The record containing the name of the node 10 where the new global mutex owner thread 56 resides is either removed from the queue 410 or is placed at the end of the FIFO queue 410 with its number of suspended threads count decremented, depending upon whether the node 10 has other threads (such as the thread 58) still waiting for the mutex 43.

Whenever the operating system 62 unblocks a thread 56 that has been waiting for the shadow local mutex 66 and event 70, the unblocked thread 56 causes the synchronization software 60 to check the global data record 402 associated with the mutex 43. If the mutex 43 is already owned, then it is assumed that the thread 56 has lost an acquisition race. Thus, the synchronization software 60 calls upon the operating system 62 first to release the shadow mutex 66 and then to suspend the thread 56 again to wait for the shadow local mutex 66 and local event 70.

The algorithm described in the preceding paragraphs is used to make certain that any thread waiting on any node will eventually get a chance to acquire a given global mutex. When a global mutex is released, it would be simpler to immediately start an acquisition race among all the nodes in the wait queue. However, this would lead to many more processor interrupts and more contention for the global spinlock among the nodes. It also could lead to access starvation of one or more of the nodes waiting for any given mutex. The latter, if it were to occur, could be construed as a clear failure to properly extend the local mutex functionality across all of the nodes of the multi-computer system.

Referring now to FIG. 6, each global mutex 43 is supported by a single global data record 400 and multiple local data records (such as the record 500 shown on the node 10), one for each node 10 and 20 where there is a thread running that has "opened" the global mutex 43. Each operation on the global mutex 43 begins with a call into the synchronization software 60 (calls to the programs 700, 800, 900, 1000, and 1200 in FIG. 6) by a thread 21 or 56 or 58 that runs on one of the nodes 10 or 20. The synchronization software 60 must find the global memory segment 42 and the global mutex data record 400, acquire the spin lock 45 within the global memory segment 42's header 54, access the global data record 400 as required by the semantics of the given operation, and then release the spinlock 45. A unique global object ID 403 (FIG. 4) and 503 (FIG. 5) is assigned to each global mutex 43 when the mutex is first created, and this ID is used by the synchronization software 60 at each node 10 and 20 to find first the local data record 500 for the mutex 43 and then, using the global memory address 504 within the local data record 500 (FIG. 5), the global data record 400 for the mutex 43, as will be explained more fully below.

C. Detailed Description of the Hardware

Having described the invention in overview, the invention will be described again with specific reference to each of the drawings. Particular emphasis will be placed upon presenting a detailed description of the synchronization software 60, which is described in detail in FIGS. 7–14. While the discussion that follows will make reference to all of the figures, it will focus particularly upon FIG. 6, which illustrates the process of acquiring and releasing a global mutex in the context of an exemplary multi-computer system 1 configured in a particular way.

FIG. 1 describes a multi-computer system 1 having at least two nodes 10 and 20, each of which contains at least two central processing units, CPUs 12 and 14 in the case of the node 10 and CPUs 16 and 18 in the case of the node 20. Each of these CPUs contains an internal cache 22, 24, 26, and 28. For illustrative purposes, the CPUs may be assumed to be of the Intel Pentium variety of a type suitable for use in multiprocessor applications.

Within each of the nodes 10 and 20 there exists, for example, a P6 processor local bus 30 and 32 that is attached to a memory and I/O controller 34 and 36. Input and output devices, such as disk storage devices, networks, and the like 46 and 48 can interface directly to the controllers 34 and 36, or there may just be one input/output arrangement that is shared by all of the computers. The controllers 34 and 36 each connect to node local memory 38 and 40 where active threads may reside. Illustratively, the local memory 38 of the node 10 contains two active threads 56 and 58, while the local memory 40 of the node 20 contains one active thread 21.

Some global shared memory segment must exist within the system 1. There may be a single global memory segment that is shared by all of the nodes and processors, or each node may provide a piece of global memory, such as the global memory segments 42 and 44 shown in FIG. 1, to which all of the processors may gain access over the buses 50 and 52, shown interconnecting the two controllers 34 and 36.

Each of the nodes 10 and 20 is shown in FIG. 1 to have a global interrupt mechanism 47 and 49 by which one node 10 or 20 might interrupt another or itself and command the performance of some task. In addition, at least one of the global memory segments 42 and 44 contains some form of global spinlock 45 or 51 that can be used in conjunction with the global mutex access program 1300 that is presented in FIG. 13 and that will be described below. In this example, the global memory segment 42 is utilized along with the global spinlock 45 to implement a global mutex 43.

The global memory segment 42 is shown containing the global mutex 43, where the mutex is shown in the drawings as a global data structure, as will be explained. In reality, of course, the mutex includes not just the global data structure but also local data structures and mutexes and events and the associated synchronization software 60.

D. Detailed Description of the Data Structures

Figure 2:
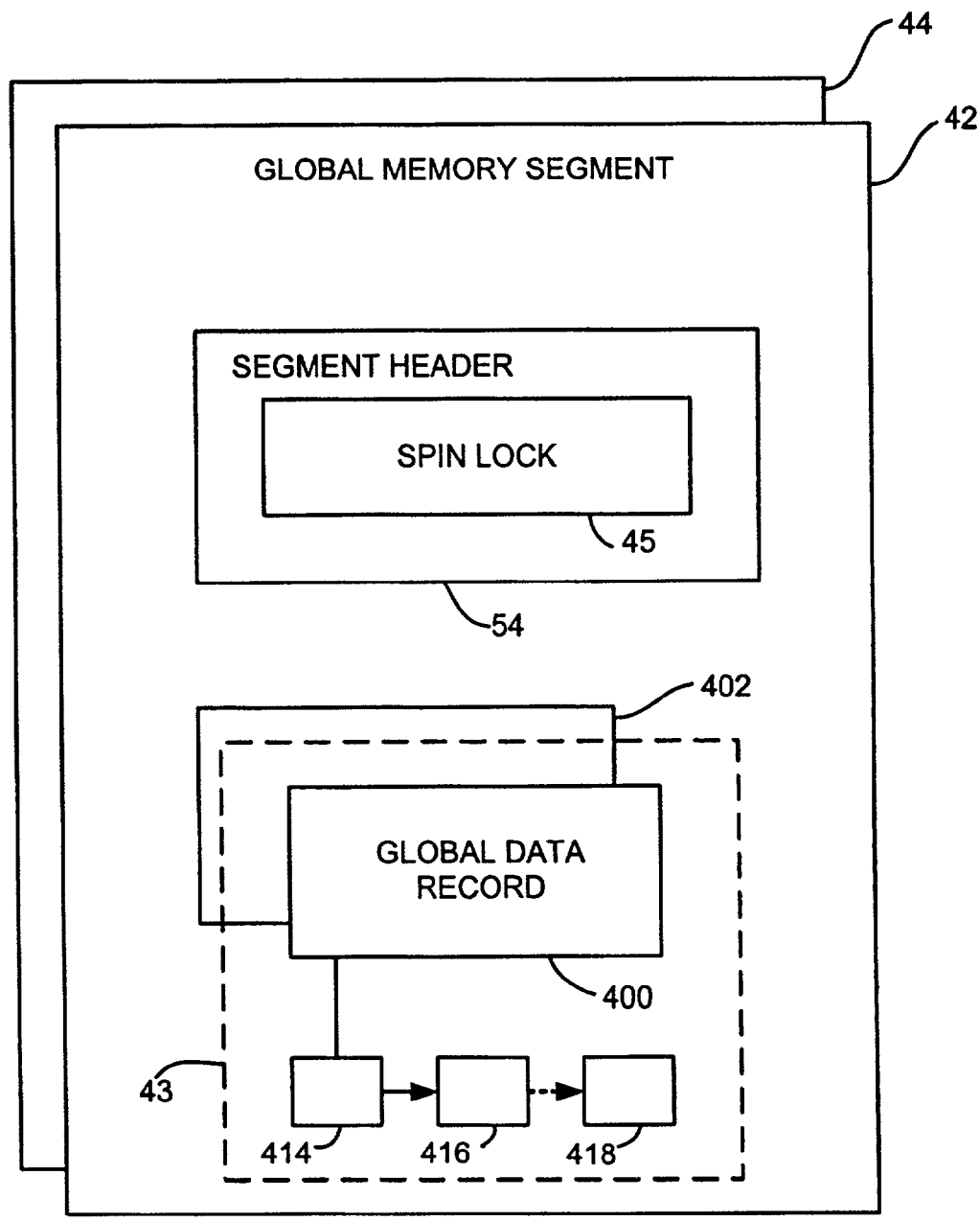
FIG. 2 illustrates in part the content of a global memory segment of the multi-computer system shown in FIG. 1.

FIG. 2 presents a more detailed description of the global memory segment 42 of the node 10. (The other global memory segment 44 is shown with no details.) The global memory segment 42 contains a segment header 54 within which lies the spinlock 45 that is used to coordinate access to the mutex 43, which also resides within the global memory segment 42. A typical mutex 43 is shown to contain a global data record 400 to which is attached (or which contains) a string or list or (as shown) linked records of suspended nodes 414, 416, and 418, representing nodes such as 10 and 20 having threads 56, 58 and 21 that are suspended and waiting for access to the global mutex 43. Another global data record 402 is shown in FIG. 2 that may be associated with some other mutex, the details of which are not shown.

The contents of the local memories 38 and 40 for the nodes 10 and 20 are shown in FIG. 3. The two threads 56 and 58 reside within the local memory 38, while the thread 21 resides within the local memory 40. Both local memories 38 and 40 contain copies of the mutex synchronization software 60 and 61, the details of which are shown in FIGS. 7–13. The local memories 38 and 40 also contain copies of the local operating system 62 (not shown in the case of local memory 40). Included within the operating system 62 are a global interrupt management program 64 which, in the case of global mutexes, launches the mutex release global interrupt program 1100 shown in FIG. 11. The local operating system 62 also contains software and data structures for creating and managing the local mutexes 66 and 68 and the local events 70 and 72. In the description that follows, the local mutex 66 and the local event 70 are associated with the global mutex 43. Each global mutex has associated with it at each node 10 that contains threads, which have opened the mutex, a local data record such as the exemplary records 500 and 502 shown in FIG. 5. The local data record 500 on the node 10 is associated with the global mutex 43.

FIG. 4 illustrates the data structure that resides in the global memory 42 and that is associated with the global mutex 43. This structure includes a global mutex data record 400. The record 400 includes a global wait queue 410, which links to (or contains) records 414, 416, and 418 that name the nodes having suspended threads awaiting the global mutex 43. Each of the suspended node records 414, 416, and 418 includes a node identifier (in FIG. 4, "NODE Q." "NODE R," and "NODE W"). NODE Q at 414 has two suspended threads, NODE R at 416 has one suspended thread, and NODE W at 418 has three suspended threads, with all of the suspended threads waiting for access to the global mutex 43. This information (suspended thread counts) is kept in a distributed fashion in the local data records. Specifically, it is kept in the data structures represented by local thread wait count 512 (FIG. 5).

Figure 5:
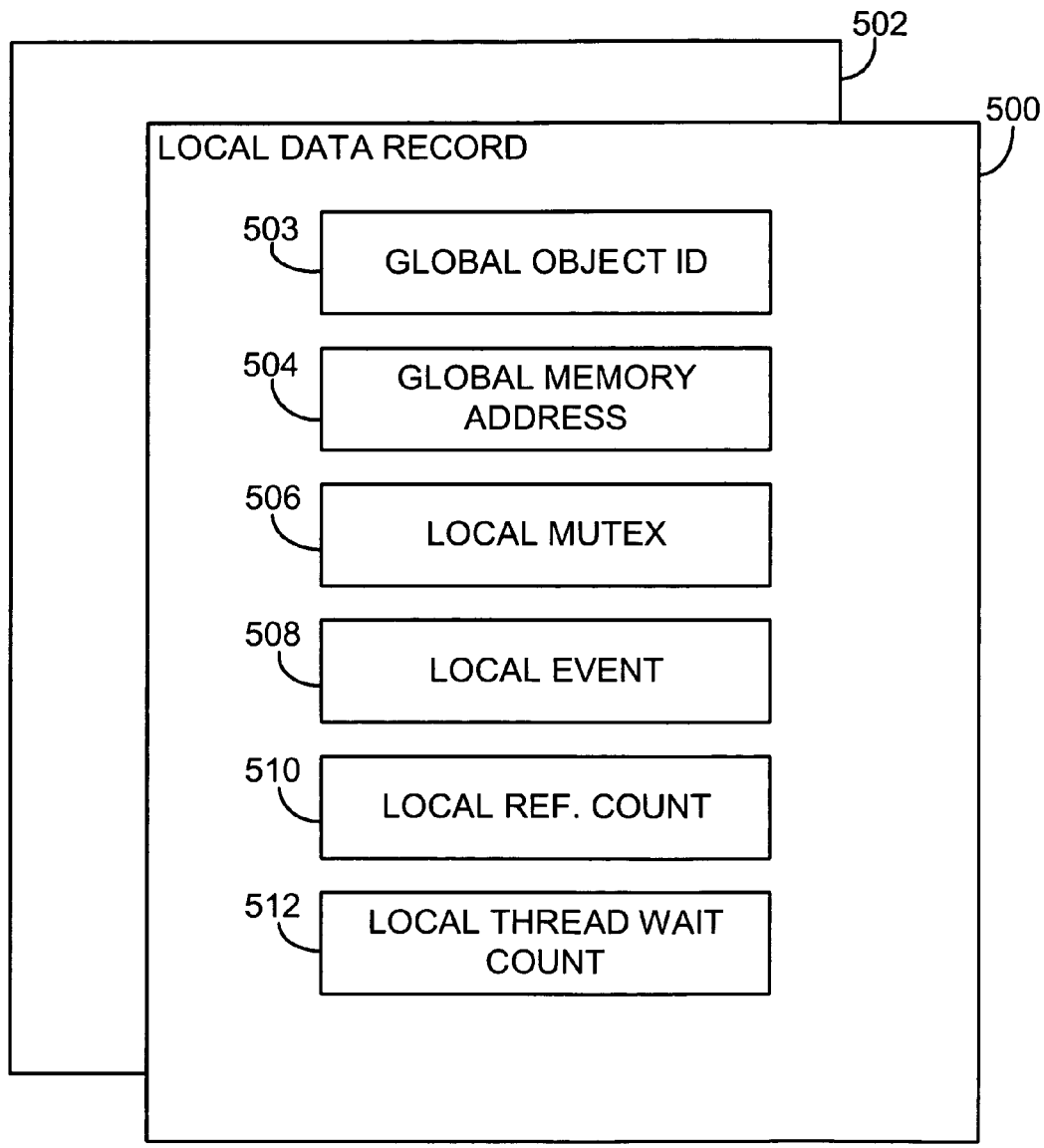
FIG. 5 illustrates the data structures of a local data record that resides within the local memory of a node and that is associated with a global mutex.

The global mutex data record 400 includes a global object identifier 403 that is unique to the global mutex 43 and that also appears at 503 in the local data record 500 in FIG. 5. The global mutex data record 400 also includes a global state designation 404 which designates the mutex 43 as "available," "owned" or "in transition", as was explained above, depending upon the activity of the threads and of the synchronization software. When a global mutex 43 is "owned," the node identifier (NODE Q," "NODE R," or whatever) of the owner is specified at 406. In addition, node references 408 records which nodes have an open reference to the global mutex. Having an open reference means that at least one thread running on the node has opened but not yet closed the global mutex. This data field allows the global memory supporting the global data record to be reclaimed for other use when there will no longer be any threads in the multi-computer that need to use the global mutex. The global wait queue 410 is shown as a linked list, but if there are only a small number of nodes, it may simply be a double- or quad-word containing node identifiers. The nodes identified value 412 is a simple bitmap data structure containing one bit for each node in which a record may be maintained of which suspended nodes have been notified that the mutex 43 is in transition and is available to be owned.

With reference to FIG. 5, the local data record 500 for the global mutex 43 in local memory 38 of the node 10 contains the mutex's global object ID as the value 503. It contains at 504 the address in global memory 42 of the mutex 43 and, in particular, the address of its data record 400. At 506, the local data record 500 contains the name of the shadow local mutex 66 that corresponds to the global mutex 43, and at 508 it contains the name of the local event 70 that also corresponds to the global mutex 43. The local reference count 510 contains the number of threads from the local node 10 that have opened the mutex 43. The local thread wait count 512 is a count of the threads suspended and waiting for the mutex 43, and in particular the number of threads running on the local node 10 that are represented by one of the data structures in the linkage of suspended threads 602, 604, and 606 (the one that contains the ID for node 10). These threads are associated with the local mutex 66 and the event 70 by the local operating system 62 (see FIGS. 2 and 6).

FIG. 6 is a special diagram intended to help illustrate how the illustrative mutex 43 functions. It contains depictions of some of the contents of the node 10's local memory 38, the node 20's local memory 40, and the global memory segment 42, which, although depicted as residing within the node 10, could reside within any node, or could be external to all of the nodes so long as it is accessible by all of the nodes.

In FIG. 6, the global memory segment 42 is shown to contain the mutex 43, and in particular, the global mutex data record 400, which contains the global wait queue 410 that links to one or more suspended nodes 414, 416, and 418.

In FIG. 6, the local memory 40, on node 20, is shown to contain an active thread 21.

Each of the local memories 38 and 40 of the respective nodes 10 and 20 contains all the programs that comprise the global mutex synchronization software 60 (described in FIGS. 7 to 14), but in FIG. 6 only the released mutex program 1000 (FIG. 10) is shown to be present in the local memory 40 of the node 20. Accordingly, the thread 21 is shown positioned to call upon the release mutex program 1000 to release the global mutex 43.

Figure 8:
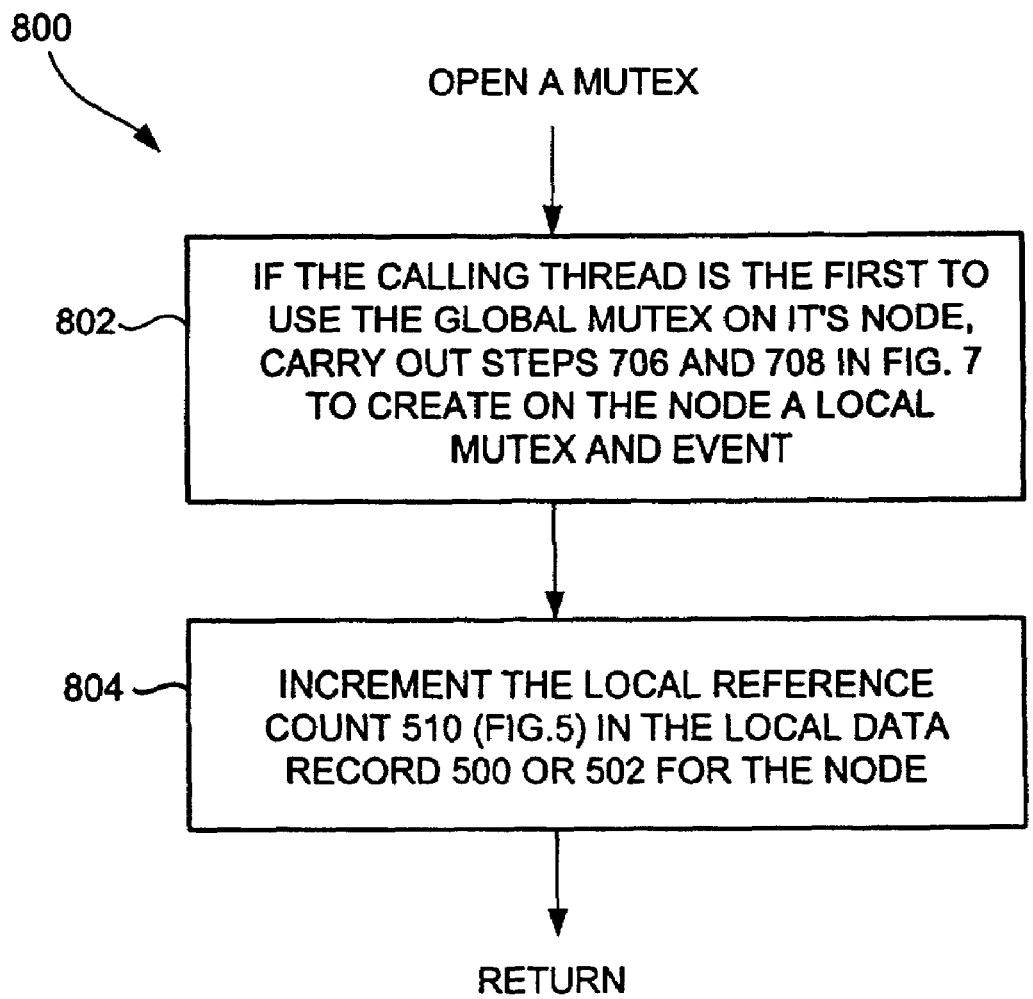
FIG. 8 is a flow diagram of the program that permits a thread to open and utilize a global mutex.
Figure 9:
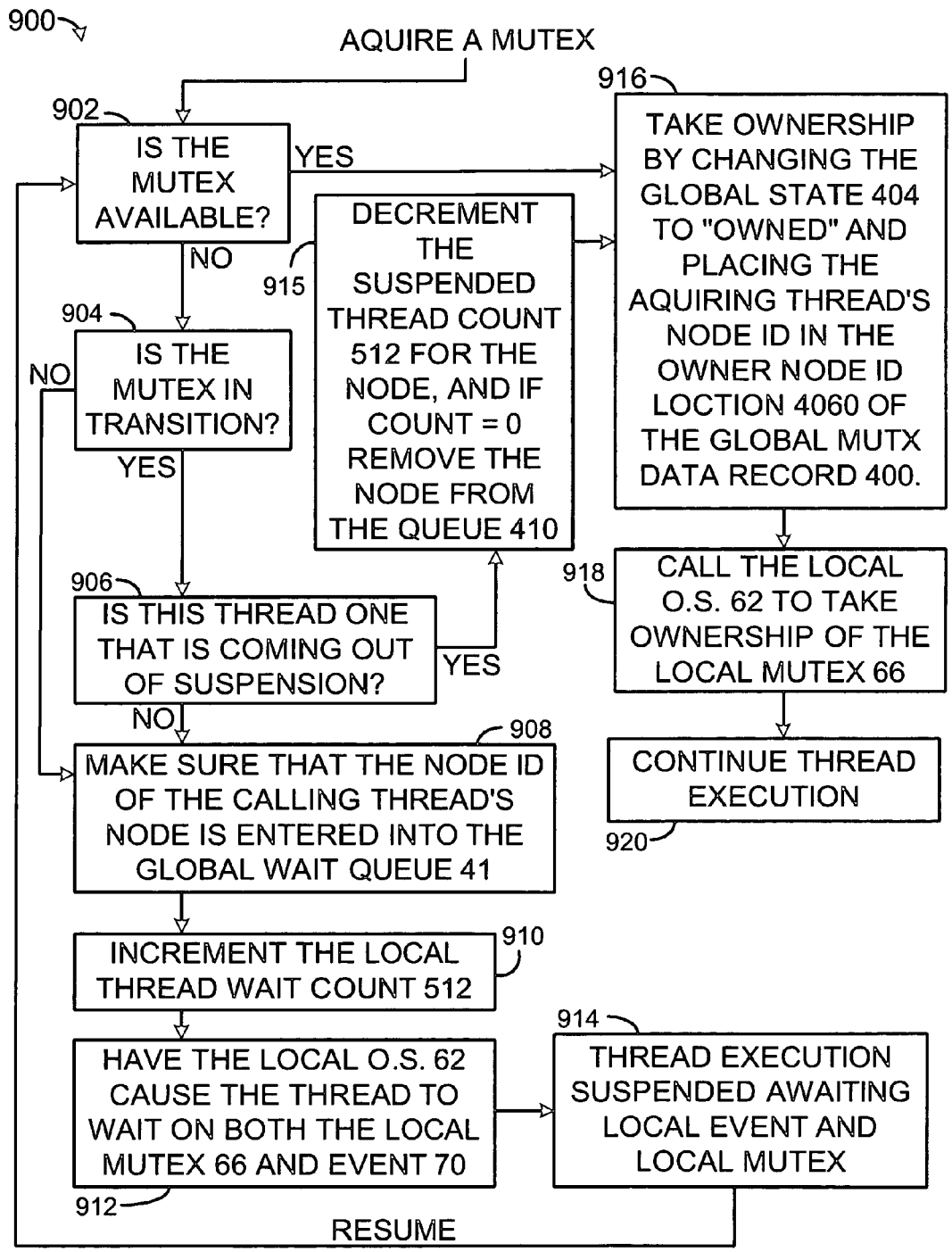
FIG. 9 is a flow diagram of the program that permits a thread to wait for and acquire a global mutex.
Figure 14:
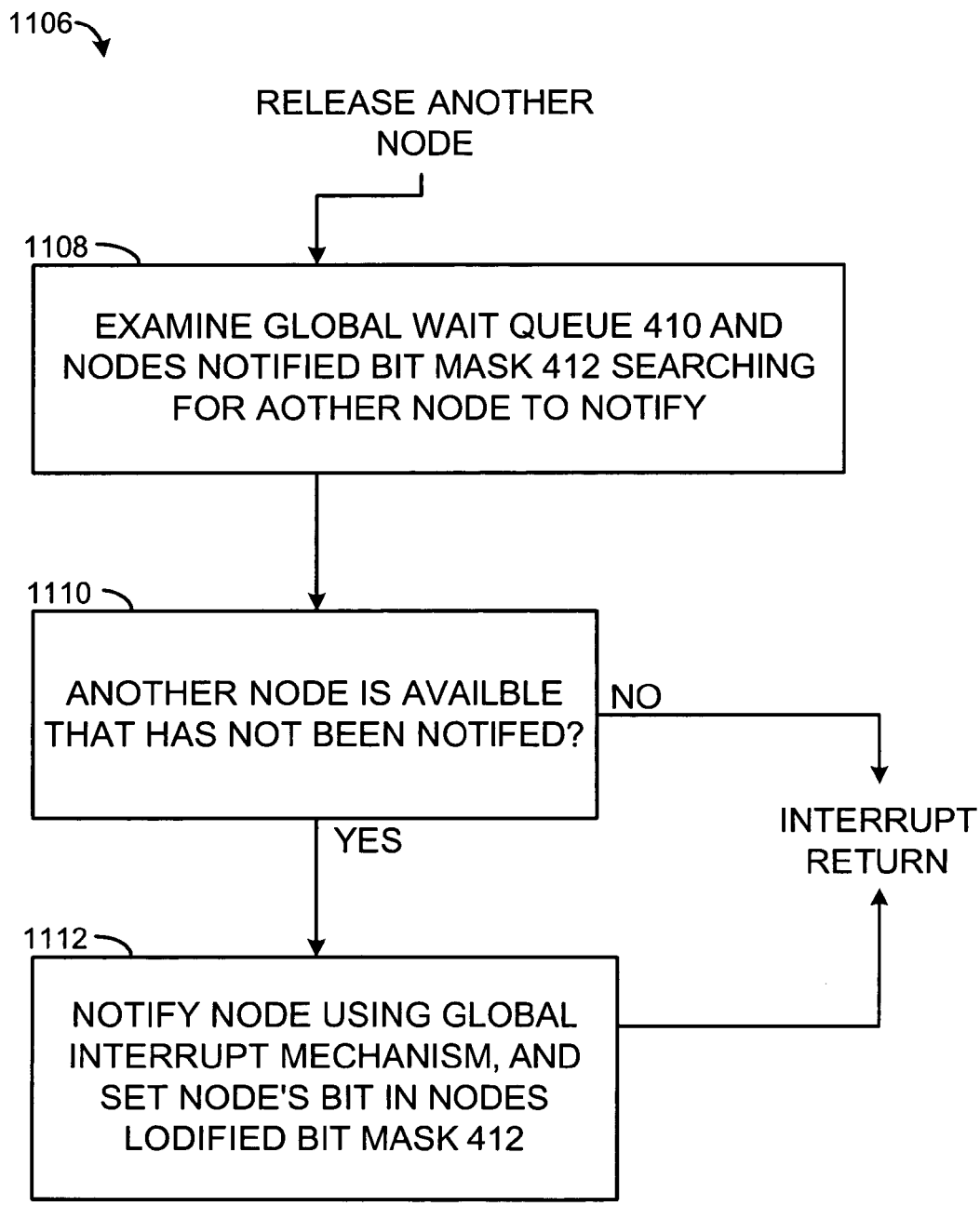
FIG. 14 is a flow diagram of a routine, called by the global interrupt program (FIG. 11) when a thread is not immediately unsuspended, that triggers the release of a thread on another node to access an available global mutex.

The local memory 38 of the node 10 is shown in FIG. 6 to contain two threads 56 and 58. The thread 56 is shown with separate subroutine linkages to all of the five programs that constitute the entry point to the synchronization software 60; and in particular, to the create mutex program 700 (FIG. 7), the open mutex program 800 (FIG. 8), the acquire mutex program 900 (FIG. 9), release mutex program 1000 (FIG. 10), and the close mutex program 1200 (FIG. 12). The thread 56 is shown positioned to attempt to acquire the mutex 43 by a call to the acquire mutex program 900 (FIG. 9). Other synchronization software 60 programs shown in the local memory 38 are the mutex release global interrupt program 1100 (FIG. 11), shown residing within the local operating system 62, and the release another node routine 1106 (FIG. 14).

The details of the synchronization software 60, in general, are not shown in FIG. 6. But the programs 900, 1000, and 1106 which need to access the global mutex data record 400 are shown calling upon a mutex access program 1300 (FIG. 13) which controls access to the data record 400 by means of the global spinlock 45 (shown in FIG. 1; not shown in FIG. 6). And the programs 1000 and 1106, which generate global interrupts, are shown in FIG. 6 executing "global interrupt" steps, respectively steps 1012 and 1112 (in FIGS. 10 and 11). These steps trigger the mutex release global interrupt program 1100 within the local operating system 62.

E. Detailed Description of the Synchronization Programs

The descriptions of the programs that constitute the synchronization software 60 (FIGS. 7–14) presented below are best understood with reference to FIG. 6. The arrows in FIG. 6 show activities, either programs reaching out to adjust data or else programs making subroutine calls to other programs, which are explained in conjunction with the detailed descriptions of the various synchronization programs and routines set forth below. Accordingly, FIG. 6 is not a flow chart but rather a diagram of programs and data residing in memory, with arrows indicating instances where programs access data or where one program calls upon another to perform a task.

1. Create a Mutex Program

Figure 7:
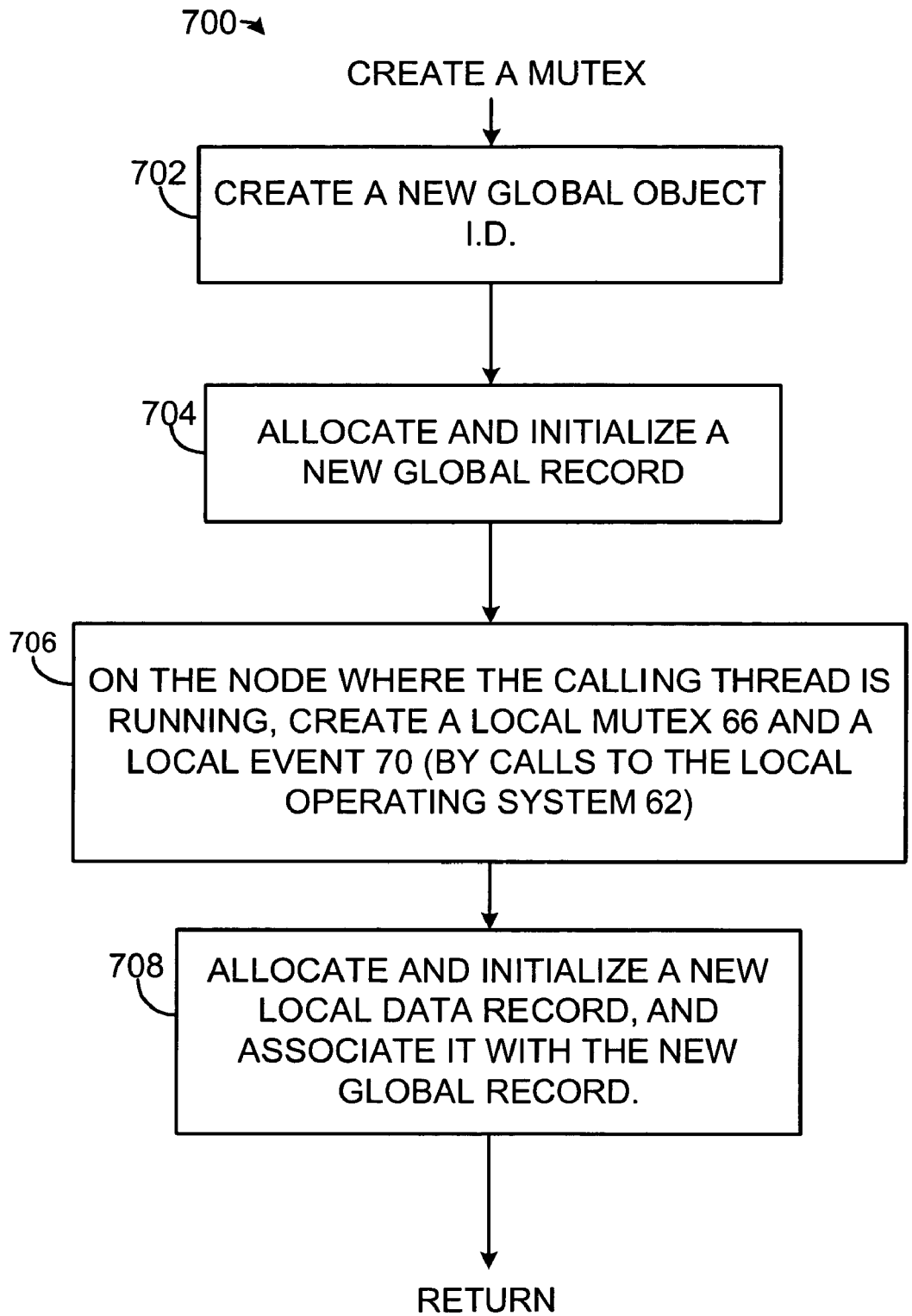
FIG. 7 is a flow diagram of the program that creates a new global mutex.

The present invention commences operation when a thread, such as the thread 56 shown in FIG. 6 calls upon the create mutex program 700 to create a new global mutex 43. With reference to FIG. 7, the program 700 begins at step 702 by creating a new, unique global object ID. Then, at step 704, it allocates and initializes a new global record 400 for the mutex within the global memory segment 42. Initialization includes recording in node references 408 that the global mutex has been opened by the node where thread 56 is running. At step 706, on the node 10 where the calling thread 56 is running, the program 700 creates a local mutex 66 and a local event 70 by calls placed with the local operating system 62. At step 708, a local data record 500 is allocated and initialized. The local data record 500 (FIG. 5) is also associated with the new global record 400 (FIG. 4) such that both contain the same new global object ID at 403 and 503, and so that the local data record 500, at 504, contains the address of the global data record 400, as was described above in conjunction with the description of FIGS. 4 and 5. This completes the process of creating the global mutex 43.

2. Open a Mutex Program

A thread may call the open mutex program 800 in order to use a global mutex that has already been created by some other thread. (The thread that calls the create mutex program 700 described in the preceding paragraph does not need to call the open mutex program). The details of the open a mutex program 800 are shown in FIG. 8. At step 802, if the thread is the first thread to open the global mutex on its node, then the steps 706 and 708 (FIG. 7) of allocating a local mutex and event and creating a local data record are carried out for its node. If the thread 56 has called the create mutex program, then this would have to be done by the thread 21 in order to use the mutex since it resides on a different node 20. But in the case of the thread 58 (FIG. 3), residing on the same node as thread 56, the step 802 can be skipped. Next, at step 804, a local reference count 510 contained within the local data record 500 is incremented so as to maintain a record of how many threads on the node 10 have opened the mutex 43.

3. Acquire a Mutex Program and Global Mutex Access Program

Let it now be assumed that the global mutex 43 is available. With reference to FIG. 4, the global state value 404 would indicate that the mutex 43 is available, and the owner node ID 406 would be blank.

Figure 13:
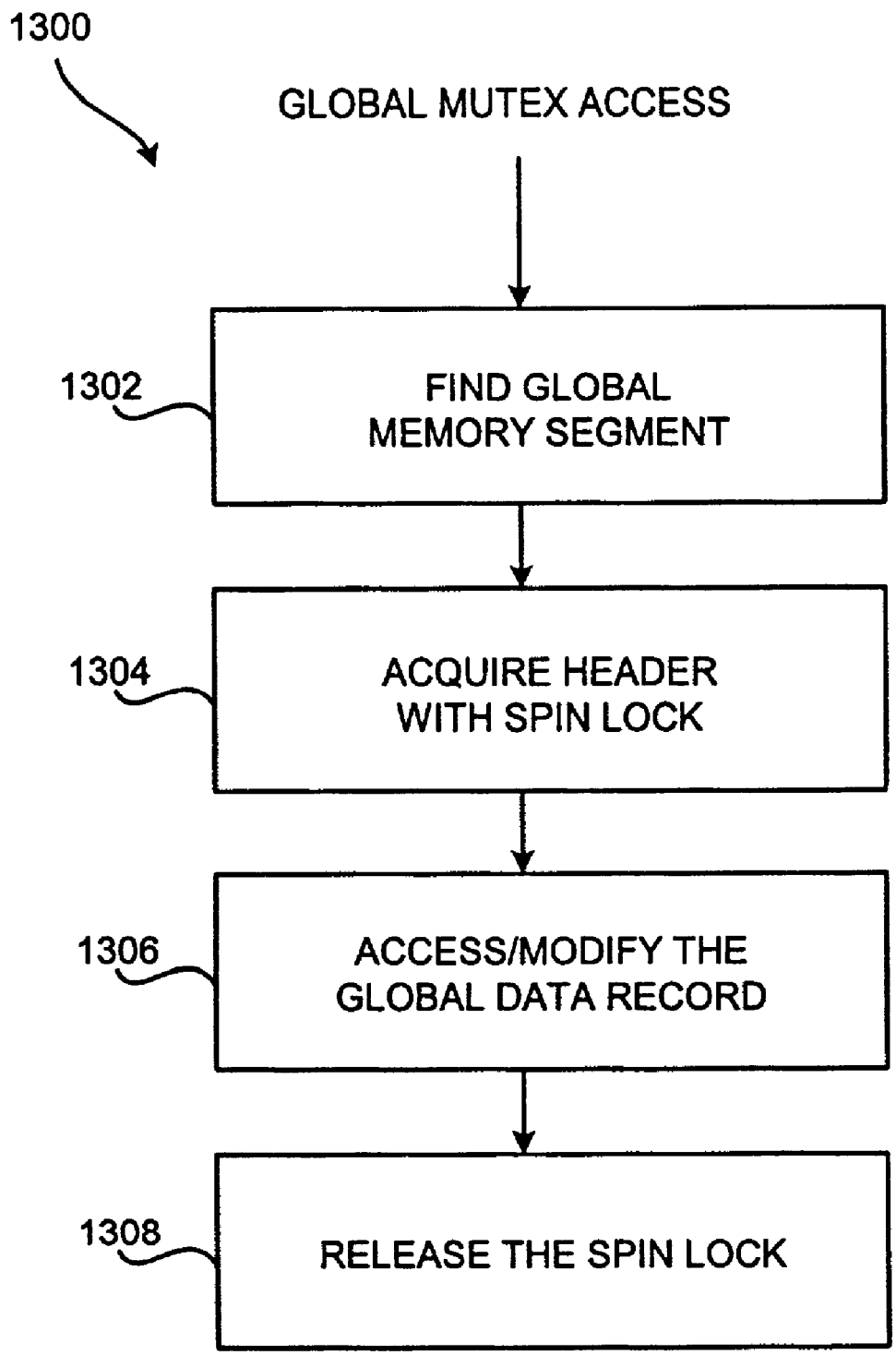
FIG. 13 is a flow diagram of a program that controls access to global mutex data records using a spinlock to coordinate access by multiple threads.

Assume that the thread 56 next attempts to acquire the global mutex 43. It does so by calling the acquire a mutex program 900, the details of which are shown in FIG. 9. With reference to FIG. 9, the acquire a mutex program 900 begins at step 902 by determining whether or not the mutex 43 is available. First, it calls upon the global mutex access program 1300, shown in FIG. 13, to gain access to the global mutex data record 400. With reference to FIG. 13, at step 1302, the access program 1300 begins by obtaining from the local data record 500 of the global mutex 43 the global memory address 504 of the global mutex data record 400. Next, at step 1304, the access program 1300 acquires the global spinlock 45. Typically, this is done by means of a hardware test-end-set primitive that performs an initial test of a spinlock data value to see whether the global record 400 is currently being accessed by some other processor. If so, then the software loops on reading the spinlock data value until the spinlock becomes free, hence "spinning." This spinning typically occurs inside of the data cache of the processor, and this reduces the impact on system resources, such as memory bandwidth, for the remaining processors. After the spinlock becomes free, the test-end-set operation is completed to gain actual ownership of the spinlock, and this achieves a "lock."

Once the spinlock has been acquired, the global data record 400 is accessed and modified at step 1306. Referring back to FIG. 9, the step 902 is carried out by checking the global state 404 (FIG. 4) of the mutex 43 to determine if it is available. Assuming that it is available, then at step 916 in FIG. 9, ownership is acquired by changing the global state 404 to "owned" and by placing the acquiring program's node ID in the owner node ID location 406 of the global mutex data record 400. Then, in step 1308 of FIG. 13, the spinlock is released. Program control then continues at step 918 in FIG. 9 with a call to the local operating system 62 to take over ownership of the local mutex 66. Then execution of the thread 56 continues, with the thread 56 carrying out some operation that is controlled and coordinated by the global mutex 43.

The acquire a mutex program 900 shown in FIG. 9 will now be described again, this time assuming that the thread 21 has previously acquired and now owns the global mutex 43. As an additional assumption, it will be assumed that the suspended node linkage record 418 shown in FIG. 6 is not present, that being the element corresponding to the node 10.

The thread 56 calls upon the program 900, and program control begins at step 902 with a test for the availability of the mutex 43. The test reveals that the global mutex 43 is not available, since it is owned by the thread 21.

Next, at steps 904 and 906, the state of the mutex 43 is examined. In this case, whether or not the mutex 43 is in transition (since the thread 56 has been running and is not just now coming out of suspension), program control continues at the step 908.

The process of suspending the thread 56 and of adding the node 10 to the global wait queue 410 now commences. First, at step 908, a check of the global wait queue 410 is carried out, and it is discovered that the node 10 is not presently in the queue 410. Accordingly, a new record 418 containing the ID of the node 10 is added to the end of the global wait queue 410. At step 910, the local thread link count 512 within the local data record 500 is incremented to show that a thread is being suspended. At step 912, the local operating system 62 is called upon to cause the thread 56 to wait upon both the local mutex 66 and also the local event 70. And at step 914, which is executed by the operating system 62, thread execution of the thread 56 is suspended awaiting the occurrence of the local event 70.

The Appendix contains illustrative code from the actual program listing of the acquire a mutex program used in the prototype version of the invention.

4. Release a Mutex Program

Figure 10:
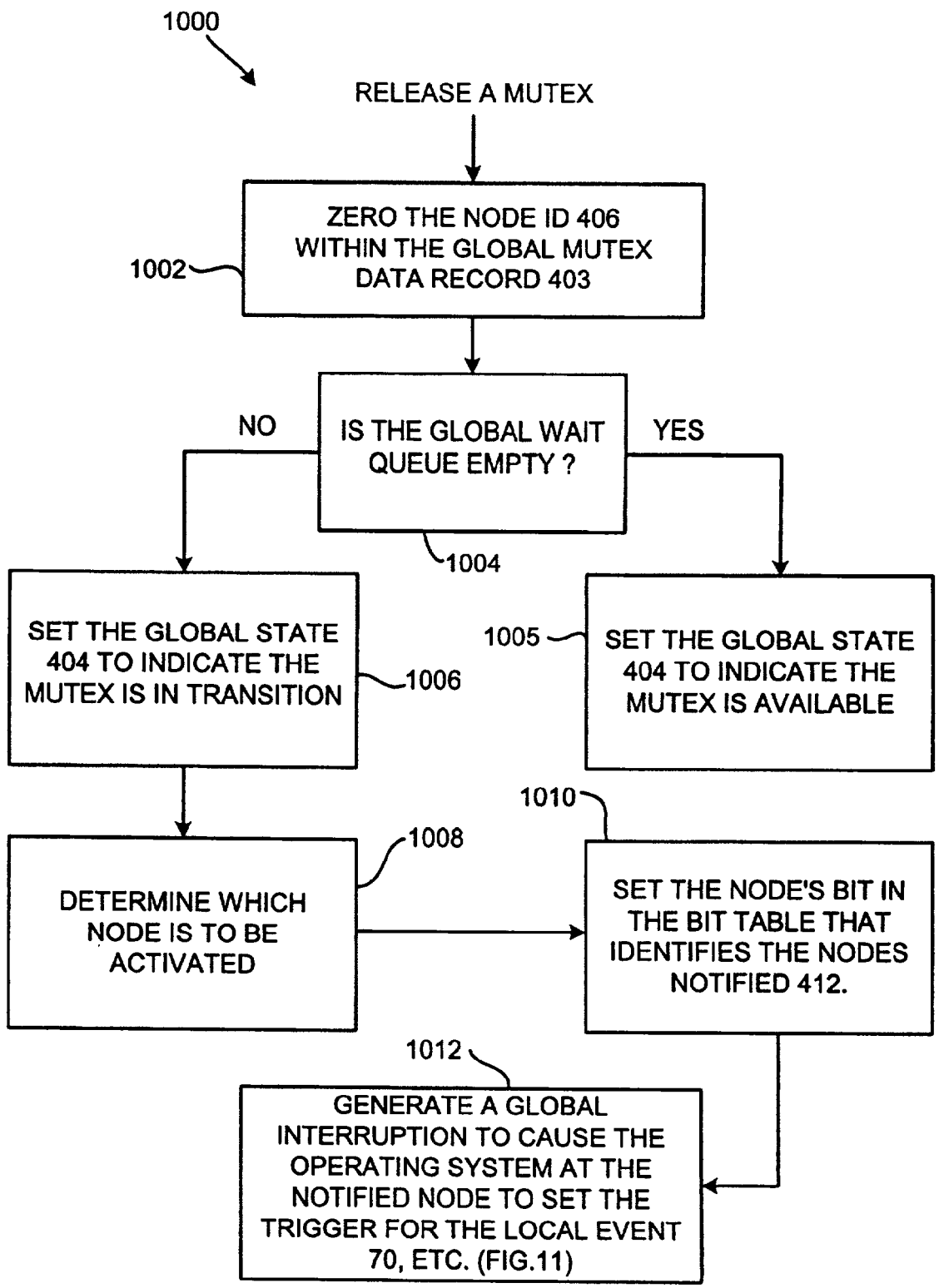
FIG. 10 is a flow diagram of a program that permits a thread to release a global mutex.

Next, let us assume that the thread 21 releases the mutex 43 by executing the release of mutex program 1000 shown in FIG. 10. Let us also assume that in the global wait queue 410 the record for the node 10 is now the record 418 positioned at the head of the FIFO queue 410. After calling upon the global mutex access program 1300 to acquire the spinlock 45 and gain access to the global mutex data record 400, the program 1000 zeroes the node ID field 406 within the global data mutex record 403 (step 1002). It then checks to see if the global link queue 410 is empty, at step 1004. If that is so, then the program 1000 running on the node 20 simply sets the global state 404 within the global mutex data record 400 to indicate that the mutex is available, after which the program 1000 releases the spinlock 45 and returns program control to the thread 21.

But the queue 410 is not empty. The thread 56 has been suspended on the node 10, along with other threads suspended on other nodes, and accordingly the global link queue 410 is not empty but includes the IDs of the nodes 414, 416, and 418 (which corresponds to the node 10). Accordingly, program control continues at the step 1006 where the global state 404 within the global mutex data record 400 is set to the "transition" state.

At step 1008, the program 1000 checks the global wait queue 410 and selects the node record 418 for the node 10 that has previously been moved to the head of the FIFO queue 410. Next, at step 1010, the bit corresponding to the node 10 is set within the nodes notified bit table 412 that identifies the nodes that have been notified of the availability of the mutex 43 during this release of the mutex. Finally, at step 1012, a global interrupt is generated that causes the operating system 42 at the node 10 to trigger the mutex release global interrupt program 1100 which triggers the local event 70 on and off as well as performing other steps. The release mutex program 1000 then returns program control to the thread 21, which then continues to execute normally.

5. Mutex Release Global Interrupt Program

Figure 11:
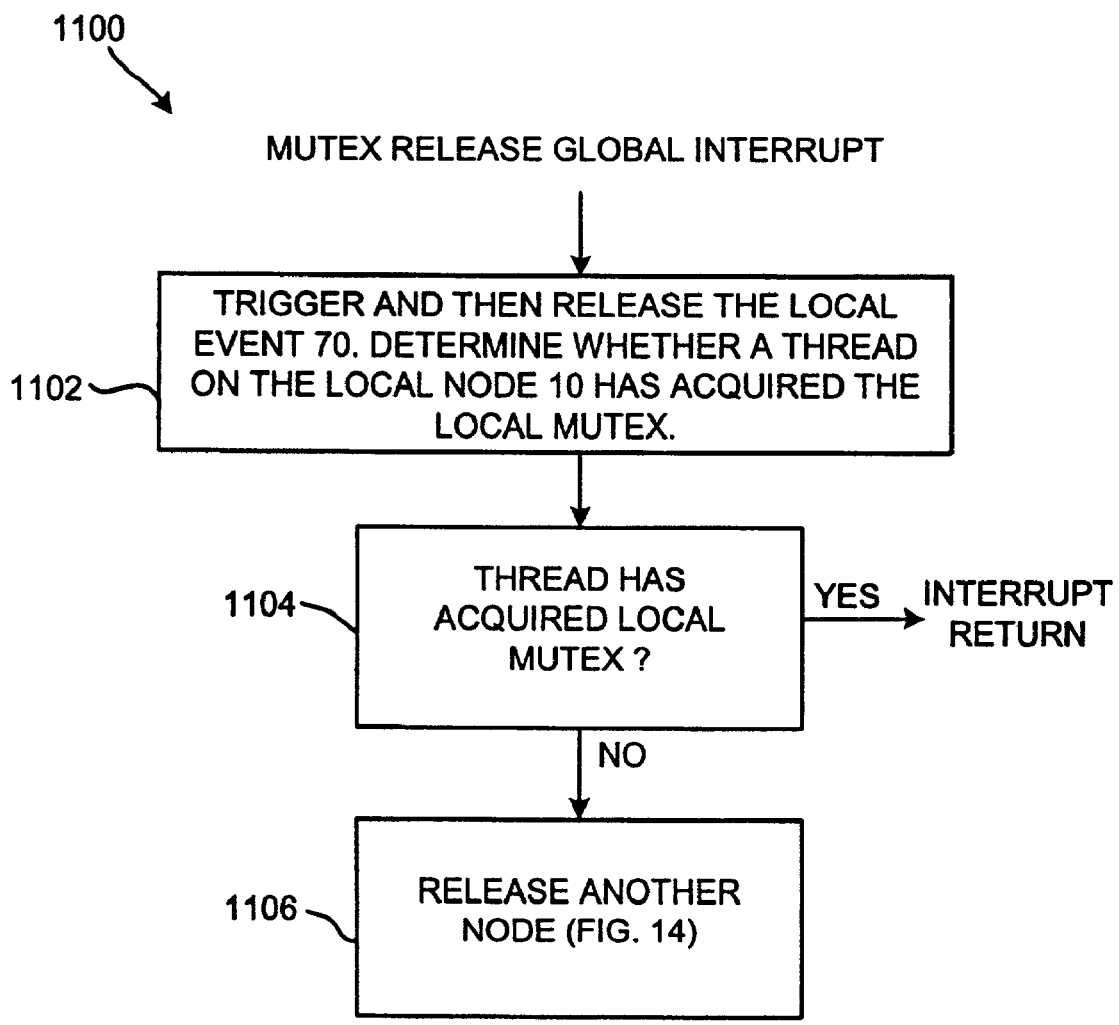
FIG. 11 is a flow diagram of a program, launched by a global interrupt directed to a particular node that attempts to grant a suspended thread access to an available global mutex.
Figure 12:
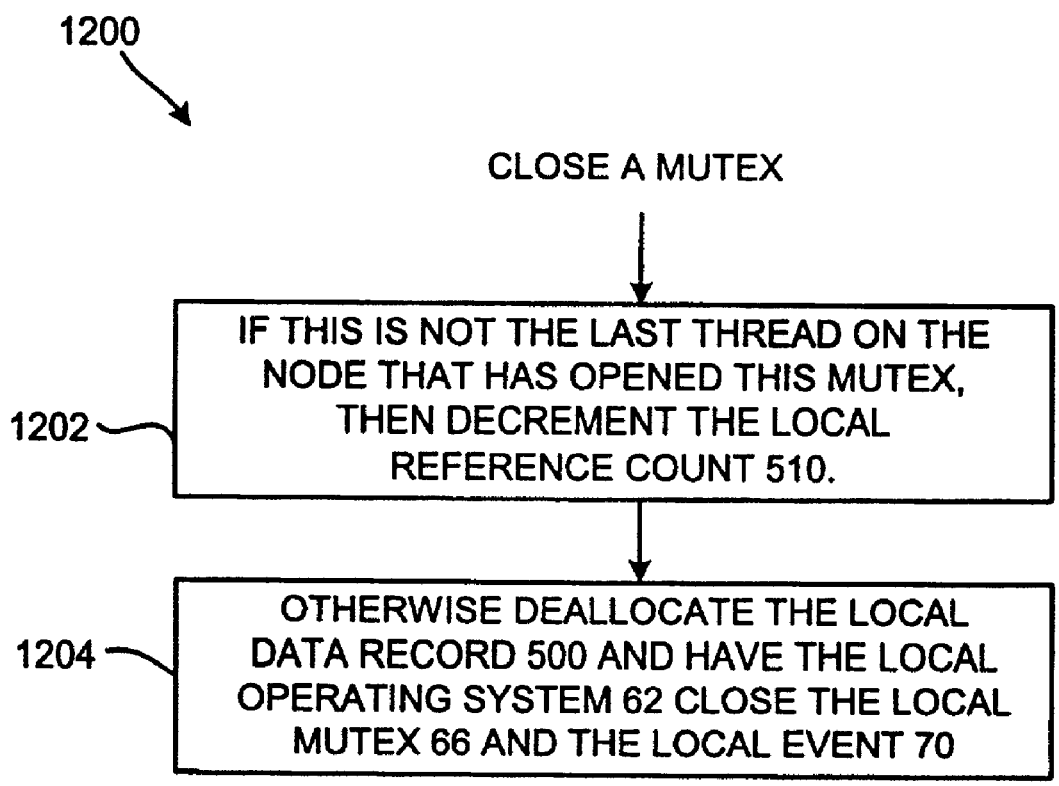
FIG. 12 is a flow diagram of a program that permits a thread to close and stop using a global mutex.

The interrupt triggers the execution of the mutex release global interrupt program 1100, the details of which are shown in FIG. 11. First, at step 1102, the local event 70 is first triggered and is then immediately released. Next, a call to the operating system 62 is performed to determine whether that triggering of the event 70 actually caused a thread on the local node 10 to acquire the local mutex 66 that corresponds to the global mutex 43. If some thread, such as the thread 56, has acquired the local mutex 66 and has been placed back into operation, then the mutex release global interrupt program 1100 is finished, and the interrupt program execution terminates.

Normally, the mutex release global interrupt program 1100 triggers the local event 70 which causes the suspended thread 56 to be activated by the local operating system 62. The activated thread 56 thus captures the local mutex 66. Program control of the thread 56, which is executing the acquire a mutex program 900, recommences at the step 902 in FIG. 9 with a test for the availability of the mutex 43. In this case, the test at step 902 in the program 900 fails, since the mutex 43 is not in the available state. Then, at steps 904 and 906, if the mutex is still in the transition state, and since the thread 56 is coming out of suspension, then the thread 56 decrements the suspended local thread wait count for its node 10 at 512 (FIG. 5). The record 418 is moved back to the end of the FIFO global wait queue 410, or is deleted if no more threads on node 10 are awaiting the global mutex (step 915). Next, the thread 56 takes ownership of the global mutex 43 at step 916. The thread then continues with steps 916 and 920 (step 918 is omitted, since the thread 56 already owns the local mutex 66). Also, the nodes notified bit mask 412 (FIG. 4) is cleared at this point.

However, it is possible that some other node's thread will gain control of the mutex 43 during the brief time during and following the interrupt while the operating system 62 is unsuspending the thread 56. If the mutex 43 is already owned, then program control is transferred to the step 908, which recommences the suspension of the thread 56, as was described previously. Some other thread has gained the mutex 43, and the thread 56 will again have to await its turn.

6. Release Another Node Routine

Returning to the step 1104 within the mutex release global interrupt program 1100, the test of whether a thread has acquired the local mutex 66 may find that the local mutex 66 has still not been acquired. This could happen, for example, if for some reason the local operating system 62 fails to unsuspend the thread 56, or if the thread 56 has been terminated. In that case, the release another node routine 1106, set forth in FIG. 14, is placed into operation by the mutex release global interrupt program 1100.

With reference to FIG. 14, the routine 1106 begins at step 1108 by examining the global wait queue 410, as was explained above (steps 1008 and 1010 in the program 1000 shown in FIG. 10), to see which is the appropriate node to notify next of the availability of the mutex 43. With reference to the nodes notified bit mask 412, if another node is available that has not been notified (at step 1110), then at step 1112 a new global interrupt is generated to notify that node, and that nodes bit in the nodes notified bit mask 412 is set so that each node is only notified once of any given transitional state availability of the mutex 43. Then the mutex release global interrupt program 1100 for the current node terminates, and program control recommences with the mutex release global interrupt program 1100 running now on behalf of the newly-notified node. Hence, program control may oscillate back and forth between the routines shown in FIGS. 11 and 14, with a different node being notified and a different thread on that different node being unsuspended with each oscillation, until the global mutex 43 is finally captured by an unsuspended thread. When all of the nodes in the global wait queue 410 linkage have been notified, this process halts.

7. Close a Mutex Program

To close and stop using a mutex, a thread calls upon the close a mutex program 1200 shown in FIG. 12. At step 1202, the local reference count 510 is decremented. At step 1204, if the count reaches zero, then no threads on this node are using (have opened and have not closed access to) the mutex. Accordingly, the local data record 500 is released, the local mutex 66 and event 70 are closed, and the node references 408 is changed to reflect that this node no longer has the global mutex open. If the node references 408 indicates there are no nodes at all in the multi-computer system that still have the global mutex open, then the global memory used by the global data record is freed so it can be reused as needed to support other global mutexes yet to be created.

While the preferred embodiment of the invention as implemented in a prototype system has been described, it will be understood by those skilled in the art to which the invention pertains that numerous modifications and changes may be made without departing from the true spirit and scope of the invention. It is accordingly intended to define the scope of the invention precisely in the claims appended to and forming a part of this application.

APPENDIX—MUTEX ACQUISITION PROGRAM

/*

Check the global state of the mutex to determine further action. If it it is available, take ownership. Otherwise, join the global wait queue and call NT to wait on a local NT mutex representing the global mutex. Upon waking up from such a wait, again access the global state of the mutex to record information consistent with the wait results returned by NT. The detailed implementation is complicated by the following:

Ownership as indicated by global state is not atomically consistent with ownership as indicated through interactions with the local NT mutexes representing the global mutex. Specifically, a thread cannot write a global ownership record and acquire a local mutex using a single lock.

Faults may occur at any time in the code path. They must be caught and managed in such a way that correct mutex semantics are preserved, and the caller does not experience abnormal behavior. In this context, acquiring mutex ownership along with an indication that the mutex has been abandoned is not considered abnormal behavior.

The circumstances identified by the preceding paragraphs lead to race conditions that typically do not occur, but which must be accounted for in the actions taken.

```
*/
NTSTATUS
McsKiWaitForSingleMutex( PMCS_GID_ENTRY pGidEntry, KWAIT_REASON WaitReason,
        BOOLEAN Alertable, LARGE_INTEGER * TimeoutParm, PVOID * ObjPtrs,
        PROCID Pid, THREADID Tid )
{
        PMUTEX_GID_INDEX pGidIndex;
        PMCS_MUTEX pMcsMutex;
        NODEID Location;
        GLOBAL_SEMREG SemReg;
        PULONG pGMStatus;
        KIRQL oldIrql;
    MUTEX_STATE mState;
    NTSTATUS Status, LockStatus;
    LARGE_INTEGER StartTickCount;
    BOOLEAN DoTimeout = TRUE;
    BOOLEAN Abandoned = FALSE;
    BOOLEAN UserMutex = TRUE;
    PUPROC_MUTEX_DATA pProcData;
```

-continued

```
pGidIndex (PMUTEX_GID_INDEX)pGidEntry->GlobalObjectData;
pProcData = pGidEntry->ProcSpecificData;
if ( TimeoutParm ) {
    DoTimeout = (TimeoutParm->QuadPart != 0);
    KeQueryTickCount(&StartTickCount);
}
Retry:
VerifyConnectedNode( pGidIndex->Location );
// Update variables that may change during recovery.
Location = pGidIndex->Location;
SemReg = MutexFindSemReg(Location, &pGMStatus);
pMcsMutex = (PMCS_MUTEX)pGidIndex->McsObjPtr;
try {
    if ( LockStatus = XxMutexAcquireSemReg(SemReg, &oldIrq1, pGMStatus) ) {
        if ( oldIrq1 == DISPATCH_LEVEL ) return LockStatus;
        // Can't wait while running at DISPATCH_LEVEL.
        // This is support for kernel mutex only.
        MutexWaitForRecovery( );
        goto Retry;
    }
    if ( (mState = pMcsMutex->State) == DEADBEEF ) {
        // For capturing memory failure errors: DEADBEEF is poison
        ExRaiseStatus( GLOBAL_MEMORY_ERROR );
    } else {
    // Capture whether the mutex has been abandoned so the caller
    // can be informed when it has.
    Abandoned = (mState & MUTEX_ABANDONED FLAG) ? TRUE : FALSE;
    mState &= ~MUTEX_ABANDONED_FLAG;
}
    switch ( mState ) {
        case MCS_MIUTEX_AVAILABLE: {
            Status = KeWaitForSingleObject( pGidIndex->MutexObjPtr,
                WaitReason, KernelMode, Alertable, &ZeroTimeout);
            if ( Status == STATUS_TIMEOUT) {
                // This is unexpected. The global mutex should not be
                // AVAILABLE unless the local representative one is.
                // If the caller wants to wait we'll release the global
                // and do a retry in case there is a strange race condition
                // that has eluded us.
                if ( DoTimeout ) {
                    // The client wants to wait. Release SemReg and try again
                    MutexReleaseSemReg( SemReg, oldIrq1 );
                    goto Retry;
                }
            }
            else if( (Status == STATUS_SUCCESS) ||
                    (Status & STATUS_ABANDONED) ) {
                // The status returned by KeWaitForSingleObject is
                // consistent with the global state we found. We take
                // ownership and change the global state to reflect that.
                try {
                    ScuCarefulOn();
                    pMcsMutex->State = MICS_MUTEX_OWNED;
                    pMcsMutex->Owner = MutexMyNodeId;
                    ScuCarefulOff();
                } except ( GetExceptionCode() == GLOBAL_MEMORY_ERROR ) {
                ScuCarefulOff();
                // DO NOTHING COMMENT
                // The memory went down after we acquired the lock and
                // found that the mutex was available. Thus, we'll proceed
                // as normal, granting ownership to the client. By placing
                // the normal information in the local recovery record,
                // we can assume the recovery thread on this node will
                // contribute to a proper rebuilding of the global state.
                }
                pGidIndex->OwnerPid = Pid;
                pGidIndex->OwnerTid = Tid;
                pGidIndex->OwnerWaitCount = 1;
                KeResetEvent(pGidIndex->EventObjPtr);
            }
            MutexReleaseSemReg( SemReg, oldIrq1 );
            if ( Abandoned ) {
                return STATUS_ABANDONED;
            } else {
                return STATUS_SUCCESS;
            }
        } // End MCS_MUTEX_AVAILABLE case
        case MCS_MUTEX_OWNED:
            if ( (pGidIndex->OwnerPid == Pid) && (pGidIndex->OwnerTid) == Tid) {
```

```
            // We've already got it. Just increment our wait count.
            pGidIndex->OwnerWaitCount++;
            MutexReleaseSemReg( SemReg, oldIrq1 );
            return STATUS_SUCCESS;
        } // else fall through to TRANSITION case
    case MCS_MUTEX_TRANSITION: {
        // If the state is MCS_MUTEX_TRANSITION (rather than a
        // fall through of MCS_MUTEX_OWNED), then the mutex
        // subsystem is in the process of changing ownership
        // from one thread to another. If the calling thread
        // is willing to wait, then it must join the wait queue.
        if( !DoTimeout ) {
            MutexReleaseSemReg( SemReg, oldIrq1 );
            return STATUS_TIMEOUT;
        }
        // Join the wait queue
        if ( pProcData ) { // User space mutex
            if ( pProcData->ProcWaitCnt++ == 0 ) {
                MutexJoinWaitQueue( pGidIndex );
            }
        } else { // Kernel space mutex
            MutexJoinWaitQueue( pGidIndex );
        }
        // We can't block while holding a spinlock
        MutexReleaseSemReg( SemReg, oldIrq1 );
        if ( pProcData ) { // User space mutex
            Status = McsCallNtWaitForMultipleObjects(
                2, ObjPtrs, WaitAll, Alertable, TimeoutParm);
        } else { // Kernel space mutex
            Status = KeWaitForMultipleObjects(
                2, ObjPtrs, WaitAll,
                WaitReason, KernelMode,
                Alertable, TimeoutParm, NULL);
        }
        // A fault may have occurred during the wait. A recovery
        // operation may be underway, or may have completed and
        // relocated the global mutex state. Check for this.
        if ( Location != pGidIndex->Location ) {
            // Rehosting must have occurred
            Location = pGidIndex->Location;
            VerifyConnectedNode( Location );
            SemReg = MutexFindSemReg(Location, &pGMStatus);
            pMcsMutex = (PMCS_MUTEX)pGidIndex->McsObjPtr;
        }
        if (LockStatus = XxMutexAcquireSemReg(SemReg, &oldIrq1, pGMStatus)) {
            if( oldIrq1 == DISPATCH_LEVEL ) return LockStatus;
            // Can't wait while running at DISPATCH_LEVEL
            // This is support for kernel mutex only.
            MutexWaitForRecovery();
            goto Retry;
        }
        // Leave the wait queue.
        if ( pProcData ) { // User space mutex
            if ( --pProcData->ProcWaitCnt == 0 ) {
                MutexLeaveWaitQueue( pGidIndex );
            }
        } else { // Kernel space mutex
            MutexLeaveWaitQueue( pGidIndex );
        }
        if ( !NT_SUCCESS(Status) ) {
            MutexReleaseSemReg( SemReg, oldIrq1 );
            return Status;
        } else {
        // Take action based on the wait status returned by
        // NtWaitForMultipleObjects. For the typical cases of
        // Timeout and Acquisition we need to update the global
        // state to be consistent with the wait status before
        // returning it to the caller.
        switch ( Status ) {
            case STATUS_TIMEOUT: {
                // Before returning a Timeout to the caller we need to
                // make sure the global state properly reflects whether
                // threads from this node are still waiting. The call
                // to TgmTransitionTimeout does this.
                try {
                    ScuCarefulOn();
                    if ( pGidIndex->WaitCount == 0 ) {
                        TgmTransitionTimeout( pMcsMutex );
                    }
```

-continued

```
                ScuCarefulOff();
            } except ( GetExceptionCode() == GLOBAL_MEMORY_ERROR ) {
                ScuCarefulOff();
                // See the preceeding DO NOTHING COMMENT. Return
                // STATUS_TIMEOUT as though nothing happed so
                // client can go do something else.
            }
            MutexReleaseSemReg( SemReg, oldIrq1 );
            return Status;
        }
        case STATUS_ALERTED: {
            MutexReleaseSemReg( SemReg, oldIrq1 );
            return Status;
        }
        case STATUS_USER_APC: {
            MutexReleaseSemReg( SemReg, oldIrq1 );
            return Status;
        }
        default:
            // We plan to grant ownership to the caller. But we need
            // to check the global state. During the transition other
            // threads from other nodes may also have become unblocked
            // (from waiting on their local mutexes), and may have gotten
            // to the global state to take ownership before we get there.
            // For the case when we get there first, we need to record
            // our claim of ownership in the global state. These actions
            // are done by TgmTransitionlDefault.
            //
            // We treat abandonment in the same way as the
            // MCS_MUTEX_AVAILABLE case except that we'll return
            // the status value used to indicate abandonment to the
            // new owner (STATUS_ABANDONED). See TgmTransitionDefault
            // which provides the return Status.
            ScuCarefulOn();
            Status = TgmTransitionDefault( pGidIndex, Pid, Tid );
            ScuCarefulOff();
            MutexReleaseSemReg( SemReg, oldIrq1 );
            if ( Status == STATUS_WAIT_0 || Status == STATUS_ABANDONED ) {
                // Ownership has been granted to the caller
                return Status;
            } else { // Status = STATUS_WAIT_1, TRY again
                // Some other thread got there first. Reset the timeout
                // value to account for the time already spent waiting.
                LARGE_INTEGER NewTickCount;
                KeQueryTickCount( &NewTickCount );
                try {
                    TimeoutParm->QuadPart +=
                        ((NewTickCount.QuadPart - StartTickCount.QuadPart)
                            * (__int64)EvClockIntTickInc);
                        if ( TimeoutParm->QuadPart < 0 ) {
                            // The new adjusted tick count is still negative.
                            // Thus the original timeout has not elapsed, so
                            // we'll try again. First reset the StartTickCount
                            StartTickCount = NewTickCount;
                            goto Retry;
                        } else {
                            // The timeout has elapsed
                            return STATUS_TIMEOUT;
                        }
                } except ( Status = GetExceptionCode() ) {
                    return Status;
                }
            }
        } // End Switch inside MCS_MUTEX_TRANSITION
    } // End NT_SUCCESS (for NtWaitForMultipleObjects)
  } // End case MCS_MUTEX_TRANSITION
 } // End switch on mState
} except ( GetExceptionCode() == GLOBAL_MEMORY_ERROR ) {
    ScuCarefulOff();
    MutexReleaseSemReg( SemReg, oldIrq1 );
    MutexWaitForRecovery();
    goto Retry;
  }
} // McsKiWaitForSingleMutex
```

The invention claimed is:

1. A method for granting threads running on various multi-processor nodes within a multi-computer system ownership of a global synchronization object comprising the steps of:
   maintaining a record of the state of the global synchronization object as free, owned, or in transition;
   when a thread seeks ownership of the global synchronization object, granting the thread, through a spinlock mechanism, access to the status of the global synchronization object, and granting the thread ownership if the global synchronization object is free;
   if the global synchronization object is owned or in transition, adding the thread's node to a queue of nodes having threads awaiting ownership of the global synchronization object, and permitting the thread to seek ownership of a local synchronization object established on the thread's node by a local operating system, but temporarily blocking other threads on the thread's node from seeking ownership of the local synchronization object and forcing them into suspension;
   when the global synchronization object ownership is released by a thread, placing the global synchronization object into its transition state, and then arranging for each node in the queue, in turn, to stop blocking threads on its node from seeking ownership of the local synchronization object, and permitting any thread that then gains ownership of its local synchronization object to resume execution and to gain ownership of the global synchronization object if the object is free or in transition, this process continuing until the global synchronization object is owned or until no more threads seek its ownership, at which point the global synchronization object enters its free state.

2. The method for granting threads running on various multi-processor nodes within a multi-computer system ownership of a global synchronization object in accordance with claim 1, wherein the local or global synchronization objects are mutexes.

3. The method for granting threads running on various multi-processor nodes within a multi-computer system ownership of a global synchronization object in accordance with claim 1, wherein the local or global synchronization objects are semaphores.

4. A set of synchronization software computer programs designed for use in conjunction with a multi-computer system, where individual nodes have their own copies of an operating system with local node synchronization software included in the operating system, said synchronization software computer programs being capable of carrying out the following steps to implement global synchronization objects:
   maintaining a record of the state of each global synchronization object as free, owned, or in transition;
   when a thread seeks ownership of a global synchronization object, granting the thread, through a spinlock mechanism, access to the status of the global synchronization object, and granting the thread ownership if the global synchronization object is free;
   if the global synchronization object is owned or in transition, adding the thread's node to a queue of nodes having threads awaiting ownership of the global synchronization object, and permitting the thread to seek ownership of a local synchronization object established on the thread's node by a local operating system, but temporarily blocking other threads on the thread's node from seeking ownership of the local synchronization object and forcing them into suspension;
   when the global synchronization object ownership is released by a thread, placing the global synchronization object into its transition state, and then arranging for each node in the queue, in turn, to stop blocking threads on its node from seeking ownership of the local synchronization object, and permitting any thread that then gains ownership of its local synchronization object to resume execution and to gain ownership of the global synchronization object if the object is free or in transition, this process continuing until the global synchronization object is owned or until no more threads seek its ownership, at which point the global synchronization object enters its free state.

5. The set of synchronization software computer programs designed for use in conjunction with multi-computer system in accordance with claim 4, wherein the local or global synchronization objects are mutexes.

6. The set of synchronization software computer programs designed for use in conjunction with multi-computer system in accordance with claim 4, wherein the local or global synchronization objects are semaphores.

* * * * *